United States Patent [19]
Merkle et al.

[11] Patent Number: 5,376,930
[45] Date of Patent: Dec. 27, 1994

[54] DATA ACQUISITION SYSTEM HAVING SELECTIVE COMMUNICATION CAPABILITY

[75] Inventors: Scott A. Merkle; Douglas A. Ochsner, both of Newton, Iowa

[73] Assignee: Maytag Corporation, Newton, Iowa

[21] Appl. No.: 872,062

[22] Filed: Apr. 22, 1992

[51] Int. Cl.$^5$ .................... G06F 7/24; G06F 15/21; H04Q 9/00
[52] U.S. Cl. ............... 340/825.35; 340/825.54; 340/505; 364/403; 364/478
[58] Field of Search ............... 340/825.35, 825.54, 340/825.55, 825.72, 825.06, 870.02, 870.28, 505, 539; 364/403, 404, 478, 479

[56] References Cited
U.S. PATENT DOCUMENTS

| | | | |
|---|---|---|---|
| 4,072,930 | 2/1978 | Lucero et al. | 340/825.54 |
| 4,119,948 | 10/1978 | Ward et al. | 340/870.28 |
| 4,146,778 | 3/1979 | Wain . | |
| 4,216,461 | 8/1980 | Werth et al. | 340/825.35 |
| 4,272,757 | 6/1981 | McLaughlin et al. | 340/825.35 |
| 4,306,219 | 12/1981 | Main et al. | 340/825.54 |
| 4,366,481 | 12/1982 | Main et al. | 340/825.54 |
| 4,369,442 | 1/1983 | Werth et al. | 340/825.35 |
| 4,477,809 | 10/1984 | Bose | 340/825.54 |
| 4,654,800 | 3/1987 | Hayashi et al. | 364/479 |
| 4,845,484 | 7/1989 | Ellsberg . | |
| 4,868,816 | 9/1989 | Katsumata et al. | 340/825.54 |
| 4,907,250 | 3/1990 | Ricks | 340/825.35 |
| 5,194,860 | 3/1993 | Jones et al. | 340/825.54 |
| 5,295,063 | 3/1994 | England . | |
| 5,299,113 | 3/1994 | England et al. . | |

OTHER PUBLICATIONS

W. Stallings, *Data Computer Communications*, pp. 105–110 (MacMillan Publishing Co. 1985).
DDCMP, Vrsion 4.0, Mar. 1, 1978, Digital Equipment Corp., Maynard Mass., USA.
"A DDCMP based Communications Protocol for the Vending Industry Data Transfer Standard," International Edition, Version 2, Feb. 1, 1992, pp. 5.i through 5.38 from a manual entitled *The Vending Industry Data Standard* produced for distribution to the members of the National Automatic Merchandising Association.
"Low Speed Optical Comms Link for the Vending Industry Data Transfer Standard," American Edition, Appendix A Draft 1, Jun. 12, 1990, pp. 5.Ai through 5.A8 from a manual entitled *The Vending Industry Data Standard* produced for distribution to the members of the National Automatic Merchandising Association.
Compute .A. Count Product Bulletin, from Rammell, Inc. of Idaho Falls, Id., 7 pages.
Wick, J., "A Question and Answer Guide to Electronic Audit Systems," 1992. The Greenwick Company Inc. of Parkesburg, Pa., 20 pages plus an Audit Product Comparison Checklist (2 pages), 1992.

Primary Examiner—Donald J. Yusko
Assistant Examiner—Mark H. Rinehart
Attorney, Agent, or Firm—Willian Brinks Hofer Gilson & Lione

[57] ABSTRACT

A data acquisition system having selective communication capability to enable the data acquisition system to communicate with other data acquisition systems. The probe of the present invention initiates communication with a data acquisition unit located in an appliance. The data acquisition unit maintains a collection record which indicates the current setup and counts of the appliance. When the probe communicates with the data unit, it identifies itself and based upon this identification, the data unit responds with a particular collection record which is compatible with the probe communicating with the data unit. In addition, if the probe is used to setup a data unit, the probe decides what type of setup record to send based upon the collection record received from the data unit.

4 Claims, 15 Drawing Sheets

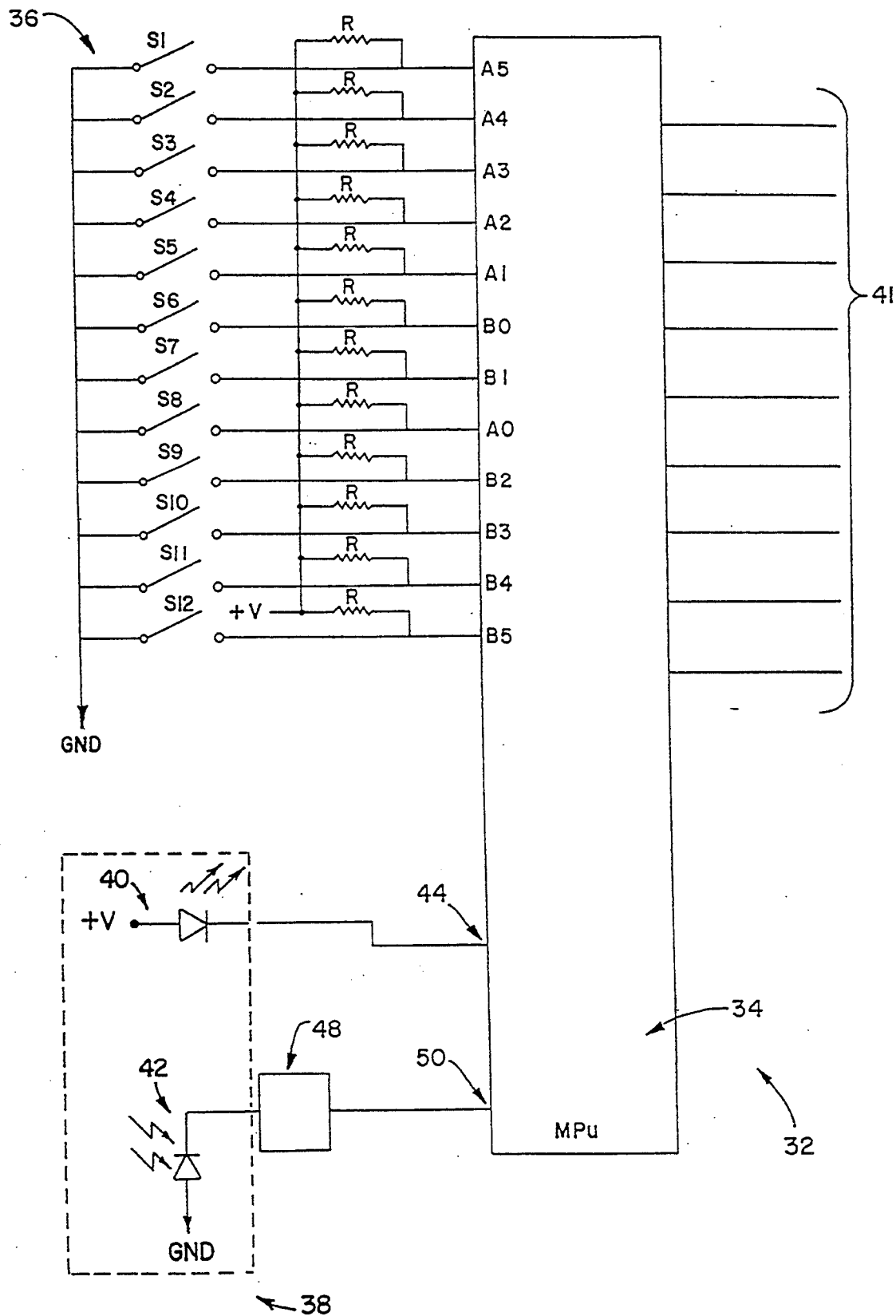

FIG. 8

| FIELD NAME | FIELD LENGTH (BYTE) | FIELD POSITION |
|---|---|---|
| RECORD TYPE | 1 | 1 |
| CAM NUMBER | 3 | 2 |
| POSITION CODE | 1 | 5 |
| LOCATION NUMBER | 3 | 6 |
| CYCLE PRICE | 1 | 9 |
| CUMULATIVE REVENUE SLIDES | 2 | 10 |
| CUMULATIVE SERVICE CYCLES | 2 | 12 |
| ELAPSED TIME | 3 | 14 |
| PROBE READINGS | 1 | 17 |
| INTERVAL REVENUE SLIDE | 2 | 18 |
| INTERVAL NO RUNS | 1 | 20 |
| INTERVAL SERVICE CYCLES | 1 | 21 |
| INTERVAL TROUBLE CYCLES | 1 | 22 |
| INTERVAL POWER CYCLES | 1 | 23 |
| INTERVAL UNAUTH. SERVICE | 1 | 24 |
| INT. AUTHORIZED SERVICE | 1 | 25 |
| TIME OF LAST SERV. | 2 | 26 |
| TIME OF LAST VAULT | 2 | 28 |
| TIME OF PREV. VAULT | 2 | 30 |
| INTERVAL VAULT DOOR | 1 | 32 |
| CUMULATIVE MONEY COUNT | 2 | 33 |
| REVISION LEVEL | 1 | 35 |
| RUN TIME OF MOTOR | 2 | 36 |
| STATUS DEBOUNCE | 1 | 38 |
| STATUS | 1 | 39 |

FIG. 9

| FIELD NAME | FIELD LENGTH (BYTE) | FIELD POSITION |
|---|---|---|
| RECORD TYPE | 1 | 1 |
| MODEL CODE | 1 | 2 |
| MACHINE ID NUMBER | 3 | 3 |
| POSITION CODE | 1 | 6 |
| LOCATION NUMBER | 3 | 7 |
| REGULAR PRICE | 1 | 10 |
| SPECIAL PRICE | 1 | 11 |
| FEATURES | 1 | 12 |
| SPECIAL PRICE DAYS OF WEEK | 1 | 13 |
| SPECIAL PRICE BEGIN TIME | 1 | 14 |
| SPECIAL PRICE END TIME | 1 | 15 |
| REG. PRICE DRYER CYCLE LENGTH | 1 | 16 |
| SPEC. PRICE DRYER CYCLE LENGTH | 1 | 17 |
| MINUTES OF WASH AGITATE | 1 | 18 |
| NUMBER OF RINSES PER CYCLE | 1 | 19 |
| MINUTES OF RINSE AGITATE | 1 | 20 |
| VALUE OF COIN 1 | 1 | 21 |
| VALUE OF COIN 2 | 1 | 22 |
| COIN 1 SETTING | 1 | 23 |
| COIN 2 SETTING | 1 | 24 |
| DESIGN DIAGNOSTICS | 2 | 25 |
| CUMULATIVE REGULAR CYCLES | 2 | 27 |
| CUMULATIVE SPECIAL CYCLES | 2 | 29 |
| CUMULATIVE SERVICE CYCLES | 2 | 31 |
| CUMULATIVE RUN TIME | 2 | 33 |
| CUMULATIVE MONEY | 3 | 35 |
| TWO MINUTE TICKER | 3 | 38 |
| CUMULATIVE NUMBER OF PROBE READINGS | 1 | 41 |
| DESIGN DIAGNOSTICS | 2 | 42 |
| INTERVAL REGULAR PRICE CYCLES | 2 | 44 |
| INTERVAL SPECIAL PRICE CYCLES | 2 | 46 |
| INTERVAL NO RUNS | 1 | 48 |
| INTERVAL SERVICE CYCLES | 1 | 49 |
| INTERVAL TROUBLE CYCLES | 1 | 50 |
| INTERVAL POWER DOWNS | 1 | 51 |
| INTERVAL UNAUTHORIZED SERVICE DOOR OPENINGS | 1 | 52 |
| INTERVAL AUTHORIZED SERVICE DOOR OPENINGS | 1 | 53 |
| INTERVAL UNAUTHORIZED COIN VAULT OPENINGS | 1 | 54 |
| INTERVAL AUTHORIZED COIN VAULT OPENINGS | 1 | 55 |
| TIME OF LAST SERVICE DOOR | 2 | 56 |
| TIME OF LAST COIN VAULT DOOR | 2 | 58 |
| TIME OF LAST TROUBLE CYCLE | 2 | 60 |
| TIME OF LAST POWER DOWN | 2 | 62 |
| TIME OF PREVIOUS SERV. DOOR | 2 | 64 |
| TIME OF PREVIOUS VAULT DOOR | 2 | 66 |
| TIME OF PREVIOUS TROUBLE CYCLE | 2 | 68 |
| TIME OF PREVIOUS POWER DOWN | 2 | 70 |
| TIME OF LAST SETUP | 3 | 72 |
| PREVIOUS REGULAR PRICE | 1 | 75 |
| PREVIOUS SPECIAL PRICE | 1 | 76 |
| PREVIOUS REGULAR CYCLES | 2 | 77 |
| PREVIOUS SPECIAL CYCLES | 2 | 79 |
| LENGTH OF LAST POWER DOWN | 2 | 81 |
| LENGTH OF PREV. POWER DOWN | 2 | 83 |
| CURRENT STATUS 1 | 1 | 85 |
| CURRENT STATUS 2 | 1 | 86 |
| DIAGNOSTIC CODES | 2 | 87 |

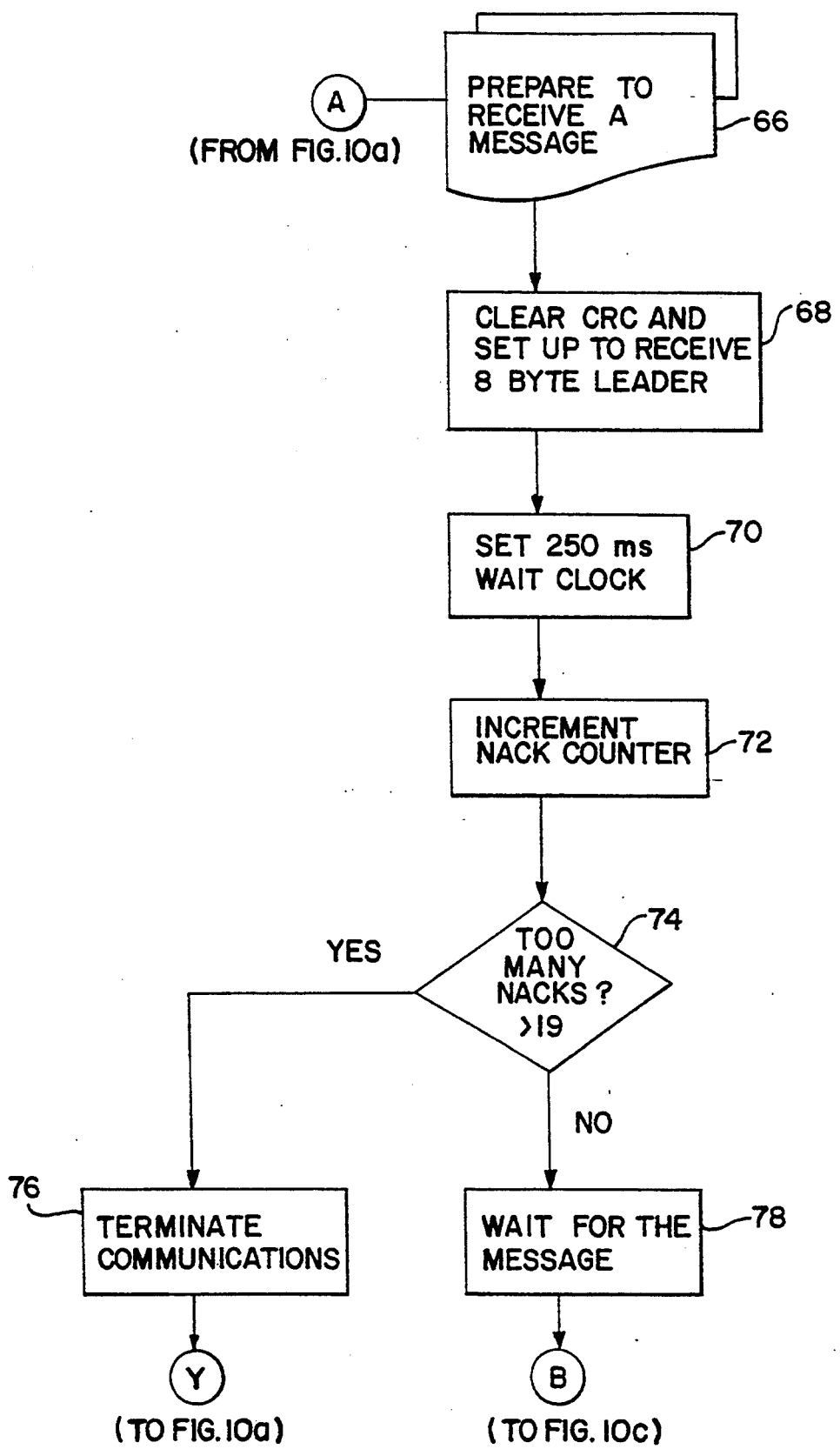

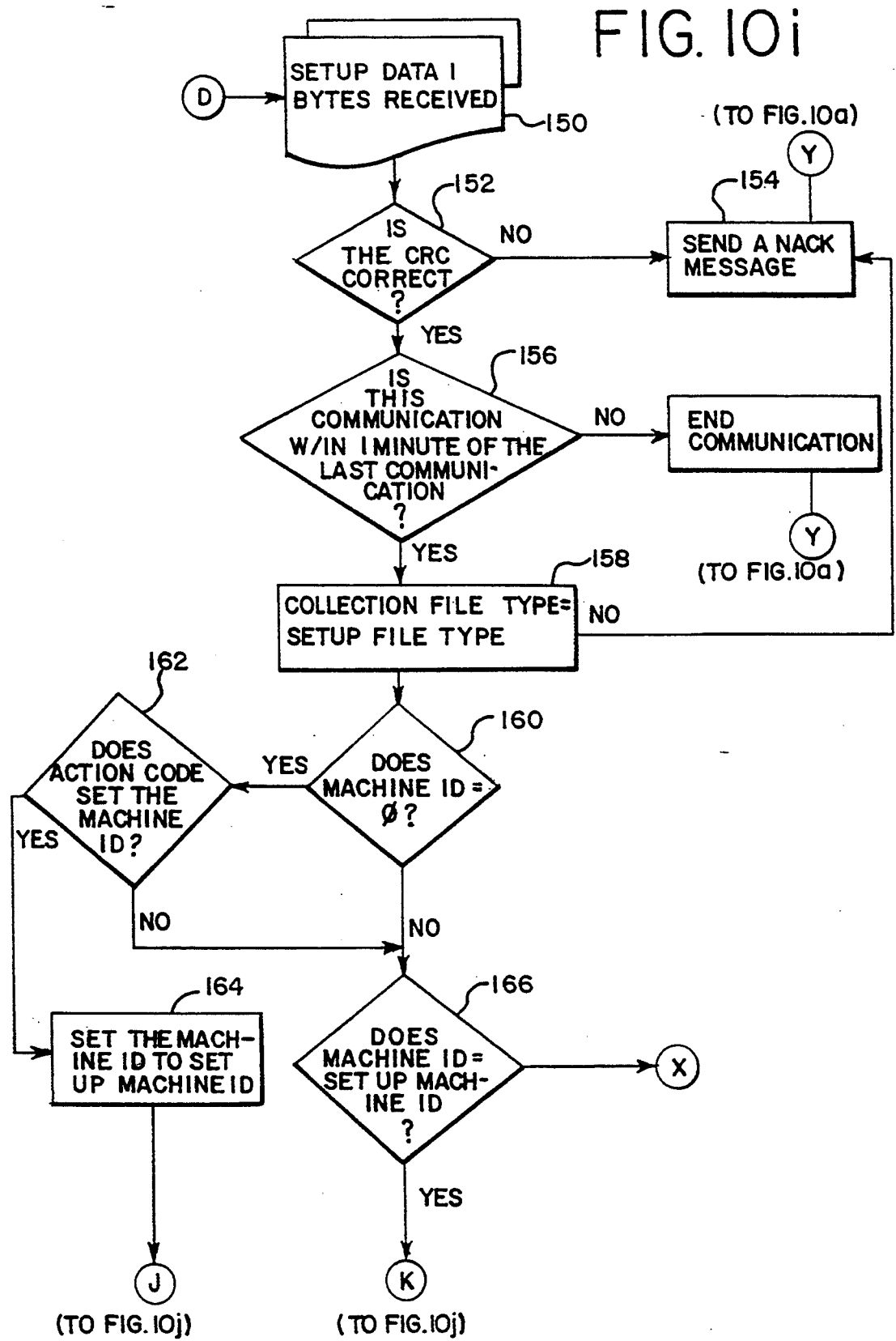

DATA ACQUISITION SYSTEM HAVING SELECTIVE COMMUNICATION CAPABILITY

REFERENCE TO RELATED APPLICATIONS

The disclosures of the following copending applications assigned to the assignee of the present application and filed concurrently herewith are specifically incorporated by reference:

"Data Acquisition System Having Setup Duplication Capability", U.S. Pat. No. 5,295,063 issued Mar. 15, 1994; and "Control Board Having Dual Means of Configuration", U.S. Pat. No. 5,299,113 issued Mar. 29, 1994.

BACKGROUND OF THE INVENTION

1. Field of the Invention

The present invention is directed to the field of data acquisition and, in particular, to a data acquisition system having selective communication capability.

2. Description of the Prior Art

In the commercial laundry field, state-of-the-art commercial laundry appliances today incorporate data accumulation and communication capabilities. For example, switches or electro-optical detectors may be provided to monitor certain aspects of machine operation, such as monies deposited, cycles vended, certain door openings, power failures and other useful information. These data may be retained in electronic memory within the appliance and subsequently communicated to a portable collection unit, such as a hand held probe or computer. Systems of this type are described, for example, in U.S. Pat. Nos. 4,369,442 (Werth et al.); U.S. Pat. No. 4,216,461 (Werth et al., and U.S. Pat. No. 4,306,219 (Main et al.). In such a system, the laundry appliance is provided with an appropriate means for establishing communication with an external device, such as an infrared optical communication link.

The prior art approaches for permitting communication between a data probe and a data acquisition unit as described above have many limitations. In particular, the data acquisition systems of this type are system dedicated The data probe interrogates the data acquisition unit of the appliance and the data acquisition unit responds by sending records of information it has accumulated. The problem, however, is the inability of either the data probe or the data acquisition unit to communicate with other data acquisition systems. For example, a first type of data acquisition system would have a data probe and data units compatible with one another but not with other data acquisition systems. A second type of data acquisition system would suffer from the same disadvantage. Thus once a data acquisition system is selected, neither the data probe nor data unit may be replaced by a probe or data unit from another data acquisition system.

This presents a disadvantage to an owner who initially purchased a data acquisition system comprising several appliances having data acquisition units and a compatible probe and later replaces some or all of the appliances by appliances having data acquisition units from a different data acquisition system. The owner would then have to purchase a second probe that was compatible with the new appliances. Not only does this increase the expense of the system and limit the owner's choice among data acquisition units, but the route operator must now carry two probes in order to communicate with all of the appliances on his route. The incompatibility of prior data acquisition systems thus complicates the data collection process and adds to the expense of such systems.

It is desirable to provide data acquisition system having selective communication capability thereby enabling the data acquisition system to communicate with various data acquisition units and probes. Such flexibility permits the owner or route operator to communicate with the appliances without having to replace the data acquisition units or purchase alternative probes.

SUMMARY OF THE INVENTION

A data acquisition system having selective communication capability to enable the data acquisition system to communicate with other data acquisition systems. The probe of the present invention initiates communication with a data acquisition unit located in an appliance. The data acquisition unit maintains a collection record which indicates the current setup and counts of the appliance. When the probe communicates with the data unit, it identifies itself and based upon this identification, the data unit responds with a particular collection record which is compatible with the probe communicating with the data unit, In addition, if the probe is used to setup a data unity the probe decides what type of setup record to send based upon the collection record received from the data unit.

Further objects and advantages of this invention will become more apparent and readily appreciated from the following detailed description of the present invention with reference to the accompanying drawings.

BRIEF DESCRIPTION OF THE DRAWINGS

FIG. 4 is an electrical schematic of a portion of a control board having an optical communication link for the appliance shown in FIG. 2.

FIG. 8 illustrates a first collection record.

FIG. 9 illustrates a second collection record.

FIGS. 10a–k illustrates flow charts for the communication protocol according to a preferred embodiment of the present invention.

DETAILED DESCRIPTION OF THE PRESENTLY PREFERRED EMBODIMENTS

Figure 1:
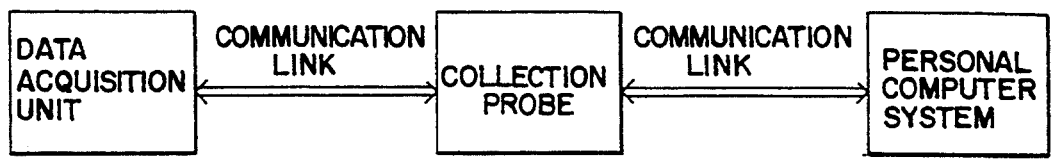
FIG. 1 illustrates a data acquisition system according to one embodiment of the present invention.

FIG. 1 illustrates a data acquisition system 10 according to the present invention. The data acquisition system incorporates three major elements: a data acquisition unit 12 which resides in an appliance such as a washer or dryer and is integral with the appliance's controller; a commercially available collection probe 14 which is carried by a route operator to interface with one or more of the appliances having data collection capability; and a personal computer system 16 for use by the route operator to receive collected information from the collection probe 14 and perform desired business analyses on the information. One aspect of the present invention is directed to the series of messages, referred to as protocol, exchanged between a data acquisition unit 12 and a collection probe 14.

Figure 2:
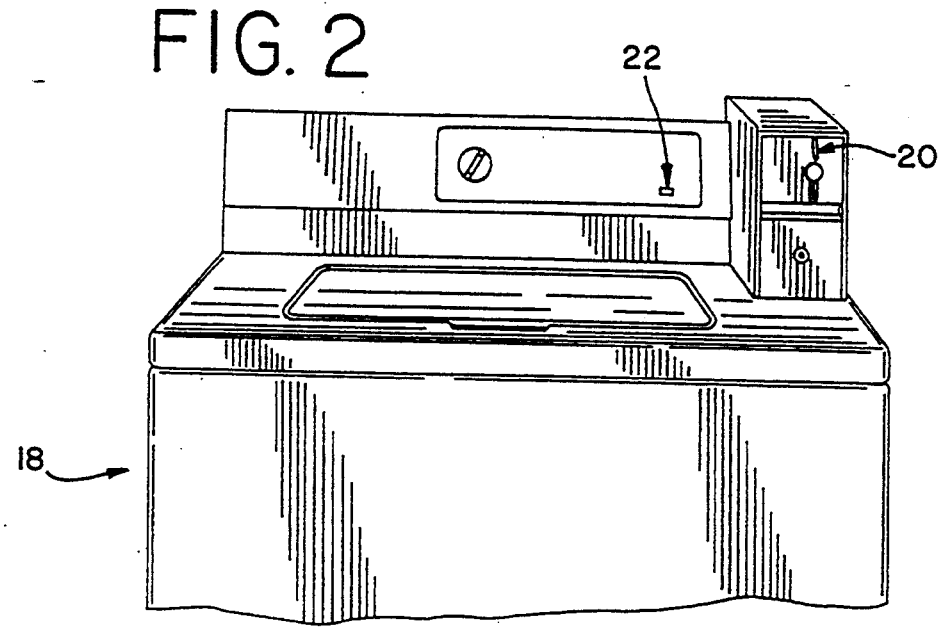
FIG. 2 illustrates an appliance equipped with optical communication capability.

FIG. 2 illustrates an appliance such as a washer 18 according to the present invention. The washer 18 is equipped with at least one coin drop slot 20, an optical window 22 behind which is an optical transceiver (not shown) having an optical emitter and an optical detector and a panel (not shown) behind which is a group of switches. The optical window 22 is provided so that the washer 18 can communicate with an external device such as a portable collection unit, for example, a hand held probe (see FIG. 3). Alternatively, the switches located behind the panel are located so as to be easily accessible by an owner or route operator and are provided to setup the appliance as described in copending patent application, incorporated herewith, entitled "Control Means Having Dual Means of Configuration" U.S. Pat. No. 5,299,113 issued Mar. 29, 1994, and assigned to the MAYTAG Corporation. Preferably, the switches are placed behind a limited access panel.

Figure 3:
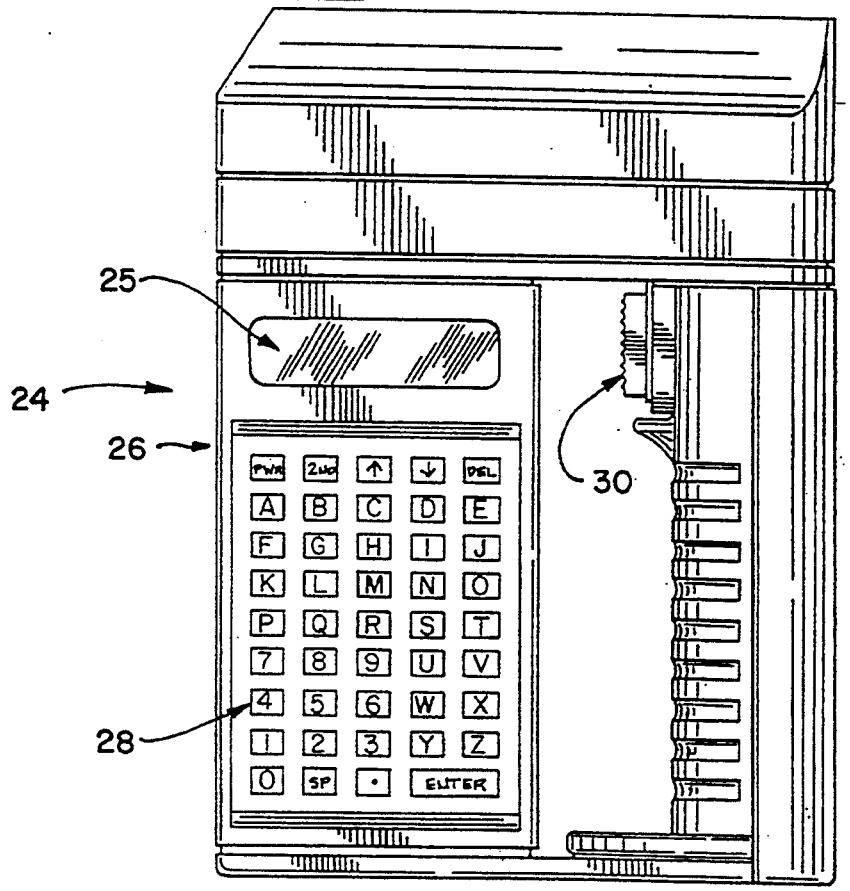
FIG. 3 illustrates a portable probe used in conjunction with the present invention.

FIG. 3 illustrates an external device in the form of a portable probe 24 which may be used in conjunction with the present invention. The probe 24 has an optical communications window 26 located on the side of the probe 24 behind which lies an optical transceiver (not shown) formed by an optical emitter and an optical detector. In addition, a keypad 28 is provided to allow the owner or route operator to select a mode of operation and enter data. There are generally three modes of operation of concern to the present invention; collection, monitor and setup which will be described in detail hereinafter. A liquid crystal display (LCD) screen 25 displays menus from which the user may select options including the three discussed above. A trigger button 30 is used to initiate sending signals to and receiving signals from the optical communications window 22 of the washer 18 after a selection is made. Preferably the probe 24 employed utilizes infrared communications although other optical wavelengths may be similarly utilized. An infrared probe is available from Mars Electronic Company commercially as the MARS MEQ ™ 130 Portable Data Terminal.

FIG. 4 is an electrical schematic of a portion of the data acquisition unit located on control board 32 having an optical communication link in accordance with the present invention for the appliance shown in FIG. 2.

The control board 32 includes a microprocessor 34, a group of dual inline package (dip) switches 36 and an optical transceiver 38 formed by an optical emitter 40 and an optical detector 42. Preferably the microprocessor 34 is a HITACHI microcomputer, model number HD 6305VO. Many types of switches may be used and preferably a 12 position dip switch, model number 76SB128 available from GRAYHILL of LaGrange, Ill. is used.

In the present invention, an appliance, such as a washer, has a relay (not shown) mounted on the control board to power or initiate an electro-mechanical timer. The timer sequences and powers various appliances such as water valves and motors. For other appliances, a plurality of relays may be mounted off the control board and electrically connected with components of the board. The relays are selectively energized for controlling the various functions of the appliance. The specific construction of the apparatus required for the mechanical functions of the appliance are well known to those skilled in the art and form no part of the present invention. For that reason, they will not be described in detail, it being understood that the relays open and close the required electrical circuits for proper operation of the appliance.

The optical transceiver 38 preferably provides two-way communication between an appliance, such as a washer 18 (FIG. 2) and the hand held probe 24 (FIG. 3). The appliance can thus transmit information to the probe 24 via its emitter 40 and receive information from the probe 24 via its detector 42. Both the probe and the data unit include memory to store information transmitted during the communication protocol.

If data accumulated by the appliance is to be collected using the probe 24, the user selects the collection mode from a menu displayed on the screen 25 of the probe 24 by the keypad 28 and begins communication with the appliance by pulling the probe's trigger 30. If the user wants to set-up or change the operational parameters of the appliance using the probe 24, the user selects a setup or configuration mode by the keypad 28 and sends a setup record to the appliance by pulling the trigger 30. The setup record is preferably created at a remote computer site and downloaded into the memory of the probe 24. The setup record may be created on-site using the keypad 28 of the probe 24, however, this is generally not as convenient. As an alternative to using the probe 24 to setup the appliance, certain parameters may be configured by the group of switches 36 as previously described.

An output 44 of the microprocessor 34 may be used and controlled by appropriate programming in a manner well known to those of ordinary skill in the art to control the optical emitter 40. The output 44 may be controlled by suitable programming of the microprocessor 34 to generate coded outputs corresponding to, for example, data received by the microprocessor 34 from various machine monitoring inputs 46 and stored in the internal memory registers of the microprocessor 34 for subsequent transmission. To avoid interference by ambient infrared and optical signals which are typically present, it is desirable to encode the transmitted intelligence on a known carrier frequency. In the preferred embodiments communications are provided by synchronous signals at 1200 baud encoded on a 30±1 Kilohertz carrier frequency. This encoding is accomplished by the microprocessor 34 in manners well known by those skilled in the art. Of course other forms of encoding may be employed if desired.

If encoding on a carrier frequency, as preferred, is employed, the receiving circuitry may include a demodulator and buffer amplifier 48. In the preferred embodiment, a MOTOROLA demodulator and preamplifier, Part No. MC3373P, is employed and the discriminated output signal is supplied to an interrupt input 50 of the microprocessor 34. Alternatively, the received signal may be supplied directly to the microprocessor 34 which itself may then decode and further discriminate the intelligence as desired in manners known in the art.

The electro-optical communication between the probe 24 and the data acquisition unit is initiated by aiming the optical communications window 26 (FIG. 3) of the portable probe 24 at the optical communications window 22 (FIG. 2) of the appliance. The probe 24 is activated by pulling the trigger button 30 to send a signal to the optical transceiver 38 of the appliance. The receiving circuitry of the appliance delivers a demodulated signal to the interrupt 50 input of the microprocessor 34 as is well known to those skilled in the art. Preferably the communication between the data acquisition unit and the collection probe is two-way with the collection probe sending control and command signals and the data acquisition unit replying by sending data records which were stored in the data unit during the operation of the appliance. The specific signals transmitted and received by the probe and the data acquisition unit will be described hereinafter.

When the probe 24 is used to interrogate a data acquisition unit, a specific interrogation and verification protocol must be successfully performed before the data collection unit in the appliance will output any data from its registers. This protocol will be described with respect to the flow charts of FIGS. 10a-k.

The present invention employs a data probe and data unit which can selectively communicate with other data acquisition systems. The data unit of the present invention is interrogated by a probe which identifies itself to the data unit and tells the data unit what information it is seeking. Based upon this identification, the data unit will respond by transmitting the requested information in a format dependent upon the identification of the probe. The data unit thus selectively chooses how it will respond to an interrogation by a probe based upon the manner in which it is spoken to. In addition, the probe of the present invention may interrogate various data units. The probe recognizes the data unit by information sent by the data unit. Based upon the identification of the data unit, the probe will respond by transmitting information in a format based upon the identity of the data unit.

Data acquisition system may utilize many different communication formats. These formats may be used to identify data units and probes from different data acquisition systems. Different data acquisition systems may employ communications using various modulation schemes, carrier frequencies and transmission rates, for example. In the preferred embodiment, the distinguishing characteristic identifying probes and data units according to the present invention is determined by specific bytes of information transmitted by the probes and data units. While a particular communication protocol will be described hereinafter, it is not intended that the present invention be limited to such a communication protocol.

Figure 5:
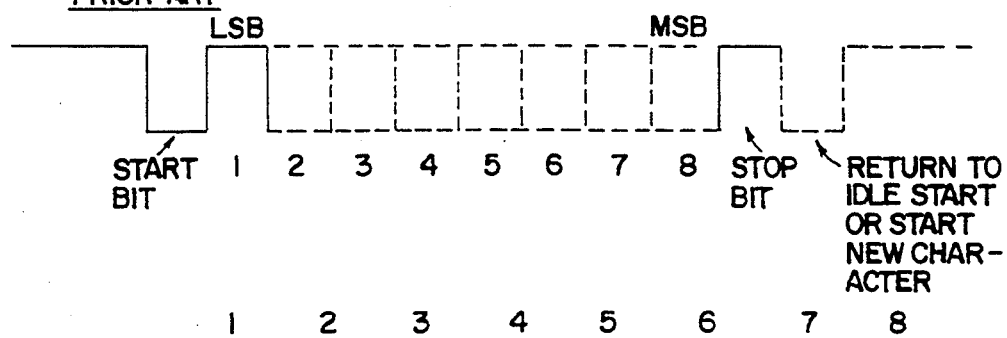
FIG. 5 illustrates the byte format used in the communication protocol.

The format of the signals sent by the probe and the data acquisition unit will now be described with reference to the preferred embodiment of the present invention. Each message is preferably transmitted serially byte by byte. FIG. 5 illustrates the byte format. Each byte comprises 10 bits having one start bit, 8 data bits and one stop bit. The data bits are not specifically coded and there are no restrictions as to data values therefore any of 256 combinations of 8 data bits may be transmitted as a data byte. Each byte is transmitted least significant bit first, after the start bit and most significant bit last immediately preceding the stop bit at a transmission rate of 1200 Baud as described above. On/off keying of optical signals is used as the modulation scheme with an amplitude modulation depth of approximately 80 to 100%. As described earlier the subcarrier frequency preferably ranges from about 29 to 31 Kilohertz. The duty cycle of the optical emitter at the subcarrier rate shall range from 40 to 60%. A binary low, i.e. "0", is defined as the presence of optical energy at the optical emitter of the probe or the data acquisition unit, i.e. carrier and subcarrier, and a binary high, i.e., "1" is defined as the absence of any transmitted optical energy from the optical emitter of the probe or the data acquisition unit.

The data communication between the data acquisition unit and the collection probe involves both control messages and data messages. The protocol specified is a variation and subset of DDCMP, a byte count protocol for data link control as specified by the Digital Equipment Corporation. (DDCMP, Ver. 4.0; 01 Mar. 1978). Error detection is included for both the control and the data messages. The error detection employs a cyclic redundancy check using the CRC-16 convention as is well known by those skilled in the art. The CRC-16 algorithm is defined by the equation $p(x) = x^{16} + x^{15} + x^2 + x^0$. [See, W. Stallings, *Data Computer Communications*, pages 105–110 (MacMillian Publishing Co. 1985) incorporated herein by reference.]

Figure 6:
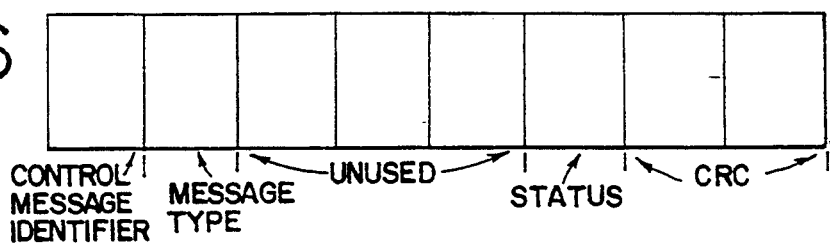
FIG. 6 illustrates the message format for a control message.

FIG. 6 illustrates the message format for a control message. The control message has 8 bytes of information. The first byte is a control message identifier and is used to differentiate control messages from data messages. The second byte defines the message type and is used to distinguish one control message from another control message. The third through the fifth bytes are not currently used. The sixth byte defines STATUS which will be described in detail hereinafter. The seventh and eighth bytes represent the low and high bytes respectively of CRC16 for the first six bytes of the control message.

There are preferably four types of control messages used: Start ("START"); Start Acknowledge ("STACK"); Acknowledge ("ACK"); and No Acknowledge ("NACK"). As mentioned above, the second byte is used to distinguish these messages. The sixth byte, STATUS, is used in the ACK message where it may have one of two possible values as will be described in detail hereinafter.

Figure 7:
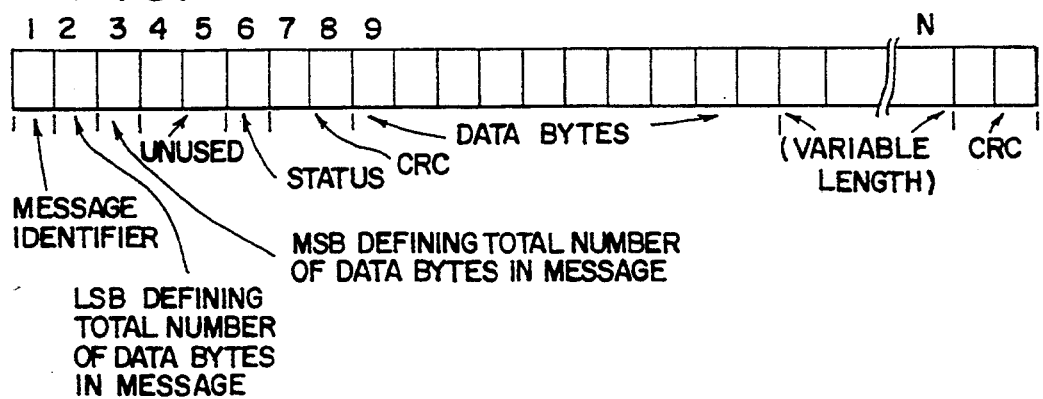
FIG. 7 illustrates the message format for a data message.

FIG. 7 illustrates the message format for a data and maintenance message. The format includes an 8 byte preamble plus a variable length data field. The first byte of the preamble is a message identifier which is used to differentiate data messages, maintenance messages and control messages. The second byte represents the least significant 8 bits of a 14 bit count defining the total number of data bytes in the message. The least significant 6 bits of the third byte define the most significant 6 bits of the 14 bit count defining total number of data bytes in the message. The fourth and fifth bytes are currently not used. The sixth byte defines STATUS. The seventh and eighth bytes define the CRC16 for the first 6 bytes. Immediately following the preamble bytes are the data bytes. The number of data bytes is variable.

There are preferably three types of data messages used: Security/Control Data ("DATA 1"); Vending Data ("DATA 2") and Bad Security Code ("BADSEC").

A DATA 1 message is always sent by the probe to the data unit. The sixth byte of the preamble, STATUS, has two possible values. The STATUS byte is used to identify the probe communicating with the data unit. The data unit thus recognizes the probe by this byte and sends information in an appropriate format in response thereto. More specifically, the data unit is directed to send a particular record. The data bytes following the preamble are variable but the following information, for example, may be transmitted. Data bytes 1-3 define an old security code in binary coded decimal (BCD) format. While these bytes are referred to as bytes 1-3, they are actually the ninth through the eleventh bytes since they immediately follow the 8 byte preamble. Bytes 4–6 define a new security code in BCD format. Bytes 7–8 define a selected mode of operation. For example, if the value of bytes 7–8 is less than a particular value, the probe is used to monitor information accumulated by the data unit. If the value is greater, the probe is used to collect information accumulated by the data unit. Bytes 7–8 act as a back-up security for an ACK message, the significance of this will become clear with reference to FIGS. 10a–h. Bytes 9–11 define the date in BCD format. Bytes 12–13 define the time in BCD format. Bytes 14–15 define CRC16. More will be said concerning how the DATA 1 information is used hereinafter.

A DATA 2 message is always transmitted by the data acquisition unit to the collection probe. Like the DATA 1 message, a DATA 2 message has an 8 byte preamble plus a variable number data field. All bytes of the preamble have the same definition as those of the DATA 1 preamble except for the sixth byte, STATUS, which is left undefined. Immediately following the preamble are the data bytes. The first through the Nth bytes define an appliance collection record. The first byte of this record distinguishes particular data acquisition units by brand or model, for example. The Nth+1 and the Nth+2 bytes define CRC16 for the N data bytes.

As described above, different types of records may be sent by the data unit. For example, if probe #1 communicates with the data unit depending upon the probe that is communicating with the unit, a collection record as shown in FIG. 8 may be sent. If probe #2, however, communicates with the data unit, a collection record as shown in FIG. 9 may be sent, which provides more information than the record of FIG. 8.

Each field length of the collection records shown in FIGS. 8 and 9 is measured in bytes with each byte having eight bits. Not every field will be described since the field name provides sufficient description as to the contents of the field. Both records contain a one byte field at the first position of the record defined as record type. This byte distinguishes the records of one data unit employing one type of data format from those of another. The record illustrated in FIG. 8 has a different value for the record type byte than the record illustrated in FIG. 9 and thus indicates different data formats.

For the record illustrated in FIG. 8, the first four fields provide information concerning the appliance and its location. The remaining fields contain information concerning the operation of the appliance. For example, the interval revenue slide field is a 2 byte field representing the number of cycles the appliance has sold since the last collection probe reading. The status debounce and status fields are 1 byte fields representing the current status of the appliance.

For the record illustrated in FIG. 9, the first five fields provide information concerning the appliance and its location. The remaining fields provide information concerning the operating parameters of the appliance. The current status 1 and current status 2 fields are 1 byte fields representing the current status of the appliance. The diagnostics field is a 3 byte field representing potential problems detected by the microprocessor.

The third type of data message, BADSEC, is always transmitted by the data unit to the probe and thus has an 8 byte preamble followed by four data bytes. The preamble bytes have the same definition as the preamble bytes of a DATA 2 message described above. A BADSEC message is distinguished from other data messages because it is the only data message that does not have a variable data field. The following data may be transmitted in a BADSEC message. Data byte 1 defines a file type. Bytes 2–4 define the appliance identification associated with the data unit in BCD format. Bytes 5–6 represent CRC16 for the 4 data bytes.

There are preferably two types of maintenance messages used: SETUP DATA 1 and SETUP DATA 2. SETUP DATA 1 is always transmitted by the probe to the appliance and SETUP DATA 2 is always transmitted by the appliance to the probe. Both maintenance messages have an 8 byte preamble plus a variable number of data bytes. All bytes of the preamble are the same as those for a DATA 1 message except the first and sixth bytes. The first byte, maintenance message identifier, has a different value from that of DATA 1, DATA 2 and BADSEC messages and thus distinguishes these maintenance message from the data and control messages. The sixth byte, STATUS, is left undefined. Immediately following the preamble are the data bytes. The first through the Nth bytes define an appliance setup record. The Nth+1 and the Nth+2 bytes define CRC16 for the N data bytes. An example of these maintenance messages will be described with reference to Tables I and II.

As described above, there are predominantly three modes of operation of the data acquisition system. A DATA 1 message is sent if the probe is used to monitor or collect information accumulated by the appliance. A SETUP DATA 1 message is sent if the probe is used to configure the appliance. Generally, the probe initiates communication with the data unit by transmitting a START message. If the data unit receives the START message, it responds by transmitting a STACK message. If the probe does not receive a STACK message or detects an error in the message, the probe will send another START message preferably after 250 ms. Failure to receive a valid STACK message after preferably nineteen tries results in a failed communication.

If the probe receives a valid STACK message, it transmits a DATA 1 message. This message identifies the probe communicating with the data unit and determines what type of record will be transmitted by the data unit in response to the DATA 1 message. The data unit will wait preferably 250 ms to receive this message. If the data unit detects an error in the DATA 1 message, it will transmit a NACK message. After receiving preferably nineteen NACK messages, the probe will end communications.

If the data unit receives a valid DATA 1 message, it compares its security code to both the old and new security codes transmitted in the data bytes of the DATA 1 message. If the security codes do not match, a BADSEC message will be transmitted by the data unit and the data unit will ignore communications for preferably 60 seconds. If the data unit's security code matches either the old or new security code of the DATA 1 message, the data unit will adopt the new security code as its own and respond with a DATA 2 message.

The probe waits preferably 250 ms for the DATA 2 message. If the probe detects an error in the DATA 2 message, it transmits a NACK message. After preferably five NACK messages, communications are ended. If the DATA 2 message is received correctly, the probe transmits an ACK message.

The data unit waits preferably 250 ms for the ACK message. Depending upon the value of the sixth byte, STATUS, of the ACK message, the data unit will clear its interval data and responds by sending an Ack message. Two timers are set, one for 30 minutes for a valid door opening and the other for one minute to allow receipt by the data unit of a SETUP DATA 1 message.

If the probe is in setup mode, the probe sends a START message and the appliance responds with a STACK message as described above. A SETUP DATA 1 message is now sent instead of a DATA 1 message. The probe determines which setup record to send from the file type field of the DATA 2 collection record it received from the data unit.

In order to setup the appliance, the machine id field of the setup record must match the data unit's machine id if it is nonzero. If they do not match, the data unit responds by transmitting a DATA 2 message in the form of a collection record. If they do match, the data unit adopts fields of the setup record depending upon the action code value, as will be described in detail hereinafter, and the data unit transmits its new setup record with the high bit of the action code set to indicate that the record is used. The probe will respond by sending an ACK message and the data unit responds with an ACK message to complete the setup.

The communication protocol between the probe and the data acquisition unit will be described with reference to FIGS. 10a–k. The blocks of the flow charts illustrated with reference to the present invention are representative of both the structure of the present invention and the function of that structure. Although in the preferred embodiments most of the decisional and operational units shown in these flow charts are contained internally in the microprocessor chip, it is equally feasible to construct them of conventional logic integrated circuits, or even with discrete components. Thus, the representation of the boxes in the flow charts of the present invention are both structural and functional and can be interpreted as hardware and/or software. In these figures, rectangles are provided to illustrate operational devices or units which may be flip-flops, solenoids, relays, etc.; and diamonds are provided to represent decision units which may be comparators, coincidence gates, or the like. Since the physical construction of each operation unit, and each decision unit, is obvious to those skilled in the art from a consideration of its function, the specific construction which may be employed for the various operation units and decision units will not be described in detail. The decision units and operation units shown in the flow charts of the present invention operate in a prescribed sequence, and control the manner in which the various functions are carried out. For that reason, the flow charts will be described in terms of one unit passing control to the next unit, implying that the previous operation or decision has been completed.

The microprocessor monitors its interrupt line as is well known to those skilled in the art to determine the presence of a signal at unit 52 (FIG. 10a). When a message is detected control is passed to unit 54 which checks the CRC to determine if an error is present in the message. If an error is present, control is passed to unit 56 which functions to ignore any inputs on the interrupt line of the microprocessor for a particular time period, preferably 175 ms. If an error is not present, control is passed to unit 58 which determines if the message is a control message. As described earlier, the first byte of the received message distinguishes control messages from other messages. If the message is not a control message, control is passed to unit 56 and communications are ignored. If the message is identified as a control message, control is passed to unit 60 where it is determined if the control message is a START message. As described earlier, the second byte of a control message distinguishes control messages from one another. If the control message is not identified as a START message, control is passed to unit 56 and communications are ignored. If the message is identified as a START message, control is passed to unit 62 which sends a STACK message. The STACK message tells the probe that the START message was received and communications can continue. Control is then passed to unit 64 which sends the CRC for the STACK message.

After the probe has received the STACK message, control is passed to unit 66 (FIG. 10b) which prepares the data unit for receiving a message from the probe. Unit 68 clears the CRC register and prepares the data unit for receiving an 8 byte header. Control is then passed to unit 70 which sets a clock for preferably 250 ms. Control is then passed to unit 72 which increments a NACK counter. Since this is the first time the NACK counter has been incremented, it will have a value of one. Control is passed to unit 74 which determines if the NACK counter is greater than a value, preferably 19. NACK messages are sent by the probe and data unit to indicate that a message transmitted by the probe or data unit has not been acknowledged. If too many NACK messages are transmitted, control is passed to unit 76 which terminates communications, otherwise control is passed to unit 78 which instructs the data unit to wait for a message.

Control is then passed to unit 80 (FIG. 10c) which receives an 8 byte header. Control is then passed to unit 82 which determines if the message is a DATA 1 message. As described earlier, the first byte distinguishes a DATA 1 message from other messages. If the message is not identified as a DATA 1 message, control is passed to unit 84 which determines if the message is a SETUP DATA 1 message. If a collection or monitor mode is selected, the probe will send a DATA 1 message. If a setup mode is selected, the probe will send a SETUP DATA 1 message. The SETUP DATA 1 message is distinguished from the DATA 1 message by the first byte of the preamble. If the first byte identifies this as a SETUP DATA 1 message, control is passed to unit 86 which tells the data unit to get all data bytes of the setup record. Control is then passed to unit 88 which receives the CRC for the SETUP message. The setup protocol will be described in detail hereinafter with reference to FIGS. 10i–k. As described earlier, before an actual SETUP DATA 1 message is transmitted the probe monitors the data unit to receive its current setup and counts in the form of a collection record. This is automatically accomplished by selecting the setup mode. The following protocol described with reference to a DATA 1 message is also automatically carried out in the setup protocol before the SETUP DATA 1 message is actually transmitted by the probe.

If the message was identified as a DATA 1 message by unit 82, control is passed to unit 90 (FIG. 10d) which receives the data bytes of the DATA 1 message. Control is then passed to unit 92 which determines if the CRC is correct. If the CRC is not correct, control is passed to unit 94 which sends a NACK message, increments the NACK counter and tells the probe to send the DATA 1 message again by returning control to unit 66 of FIG. 10(b). If the CRC is correct, control is passed to unit 96 which determines if the monitor or collection mode was selected. As described earlier, this is determined by data bytes 7–8 of the DATA 1 message and an appropriate bit is set to indicate that the probe is acting as a monitor or collector. As will become apparent from the following detailed description, bytes 7–8 are used as a backup security to the ACK message. As described above, the sixth bytes STATUS, of the ACK message, can have one of two values which will either clear interval data or not. Interval data refers to data accumulated between data collections. When the probe is acting as a collector, the interval counts will be cleared whereas when the probe is acting as a monitor, the interval counts are not cleared. Thus if the appliance does not receive a final ACK message at the end of communications from the probe, bytes 7 and 8 of the DATA 1 message ensure that the data unit will clear its interval data if the probe is acting as a collector. In the preferred embodiment, bytes 7–8 will only clear interval data if probe #2 from the example communicates with an appliance having a collection record as shown in FIG. 9.

Control is then passed to unit 98 which determines if the preamble of DATA 1 message is valid. If it is not, control is passed to unit 94 which functions to transmit a NACK message as described above. If the preamble is valid, control is passed to unit 100 which increments the number of probe readings in the collection record of the data unit and clears the NACK count. Control is then passed to unit 102 which determines if the service and vault doors are open. If they are open, control is passed to unit 110 (FIG. 10e) which tells the data unit to adopt a new security code contained in data bytes 4–6 of the DATA 1 message. If the doors are not open, control is passed to unit 104 which determines whether the data unit security code matches the old security code contained in data bytes 1–3 of the DATA 1 message. If they match, control is passed to unit 110 where the data unit adopts the new security code. If they do not match, control is passed to unit 106 which determines whether the data unit security code matches the new security code contained in data bytes 4–6 of the DATA 1 message. If they do not match, control is passed to unit 108 which tells the data unit to send a BADSEC message.

If the data unit's security code matched the setup new security code as determined by unit 106 or the data unit's security code was changed to the setup new security code by unit 110, control is passed to unit 112 which gets data bytes 9–13 of DATA 1 for the date and time. Control is then passed to unit 114 which determines the identity of the probe communicating with the data unit. As described earlier, the sixth byte of the DATA 1 preamble, STATUS, identifies the probe. If the probe is identified as probe #2, control is passed to unit 116 which sends a header and then CRC for a DATA 2 message. If the probe is identified as a probe #1, control is passed to unit 118 which sends a header and then CRC for a DATA 2 message.

If the probe was identified as probe #2, control is passed from unit 116 to unit 120 (FIG. 10f) which prepares to send a DATA 2 message. Control is passed to unit 122 which first copies the interval and cumulative counts from the collection record into temporary storage in the appliance. Control is passed to unit 124 which sends a DATA 2 message having data bytes describing the record fields illustrated in FIG. 9 and the CRC for the DATA 2 message.

If it was determined at unit 114 that probe #1 was communicating with the data unit, control is passed to unit 146 (FIG. 10g) which prepares to send a DATA 2 message having a collection record as shown in FIG. 8. Control is then passed to unit 148 which first copies the interval and cumulative counts from the collection record into the temporary storage of the appliance. Control is then passed to unit 149 which sends the DATA 2 message and CRC.

After the appropriate DATA 2 collection record and CRC have been sent, control is then returned to unit 66 which prepares the data unit for receiving a message as described earlier and therefore need not be described again. Control is then passed from unit 78 to unit 126 (FIG. 10h) to receive a message. Control is then passed to unit 128 to determine if the CRC is correct. If the CRC is correct, control is passed to unit 130 which determines if the received message is a control message. If the message is identified as a control message, unit 132 determines if the message is a START message. If either the CRC is not correct as determined by unit 128 or the message is not a control message as determined by unit 130, control is returned to unit 114 (FIG. 10e) which determines which probe is communicating with the data unit. The data unit will resend a DATA 2 message and wait for a message from the probe. If the message at unit 132 is identified as a START message, control is passed to unit 134 which sends a STACK message. Control is then passed to unit 52 (FIG. 10a) which begins the communication protocol over again. If the message is not a START message, control is passed to unit 136 which determines if the message is an ACK message. If it is an ACK message, control is passed to unit 138 which determines if the interval data should be cleared. As described earlier, the sixth byte, STATUS, of the ACK message can have one of two values. One value clears the interval data while the other does not for a preferred data acquisition system.

If the interval data is to be cleared, control is passed to unit 140 which clears the data. If the message is not an ACK message or the interval data is not to be cleared, control is passed to unit 142 which sees a valid door timer preferably to 30 minutes. Control is then passed to unit 144 which sends a final ACK message. If a final ACK message is not sent, bytes 7–8 of the DATA 1 message sent by probe #2 in the preferred embodiment ensure that the interval counts are cleared if the probe was acting as a collector.

If the setup mode of operation is selected, the probe transmits a setup record to the data unit no either setup the data unit for the first time or reconfigure the data unit's setup record. When the setup mode is selected, the probe automatically first receives a collection record in a DATA 2 message from the data unit it is communicating with before a setup record is sent. The data format used by the data unit is identified by the record type located in the first byte of the collection record. The setup record transmitted by the probe will depend upon the record type of the data unit. The setup record for a first data unit may contain the fields of information shown in Table I below.

TABLE I

| Field Name | Field Length (byte) | Field Position |
|---|---|---|
| Record Type | 1 | 1 |
| CAM number | 3 | 2 |
| Washer/Dryer Position | 1 | 5 |

TABLE I-continued

| Field Name | Field Length (byte) | Field Position |
|---|---|---|
| Location | 3 | 6 |
| Debounce/Vend Code | 1 | 9 |
| Action Code | 1 | 10 |
| Cumulative Revenue Slides | 2 | 11 |
| Cumulative Service Cycles | 2 | 13 |

The setup record for a second data unit may contain the fields of information shown in Table II below.

TABLE II

| Field Name | Field Length (byte) | Field Position |
|---|---|---|
| Record Type | 1 | 1 |
| Model Code | 1 | 2 |
| Machine ID No. | 3 | 3 |
| Position Code | 1 | 6 |
| Location No. | 3 | 7 |
| Regular Price | 1 | 10 |
| Special Price | 1 | 11 |
| Features | 1 | 12 |
| Special Price Days of Week | 1 | 13 |
| Special Price Begin Time | 1 | 14 |
| Special Price End Time | 1 | 15 |
| Reg. Price Dryer Cycle Length | 1 | 16 |
| Special Price Dryer Cycle Length | 1 | 17 |
| Washer Cycle Length | 1 | 18 |
| Number of Rinses per Cycle | 1 | 19 |
| Minutes of Rinse Agitation | 1 | 20 |
| Value of Coin 1 | 1 | 21 |
| Value of Coin 2 | 1 | 22 |
| Action Code | 1 | 23 |

Both setup records have a one byte "action code"-field. Depending upon the value of the action code byte, particular fields of the setup record will be adopted by the data unit.

Table III below illustrates the action code values, the associated bits which need to be set and the adopted fields. A set bit indicates that a bit is either in a high or low state, preferably high compared to the other bits.

TABLE III

| Action Code Value | Set Bit | Adopted Field |
|---|---|---|
| 0 | n/a | no action |
| 1 | 0 | set or clear machine id |
| 2 | 1 | set location/position |
| 4 | 2 | set price |
| 16 | 4 | set cycle length |
| 32 | 5 | clear interval counts |
| 128 | 7 | record already used |

Figure 10C:
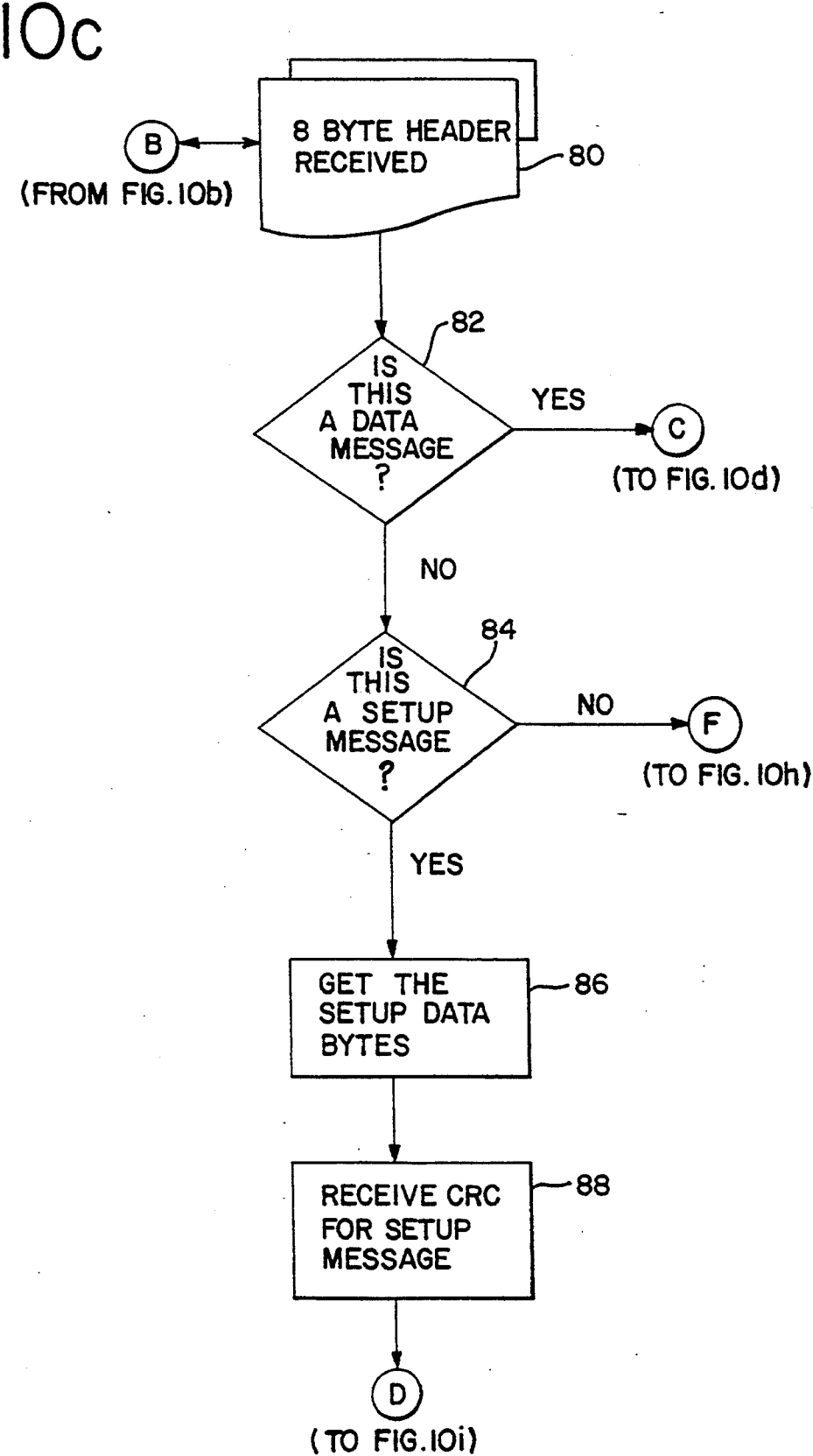
Figure 10D:
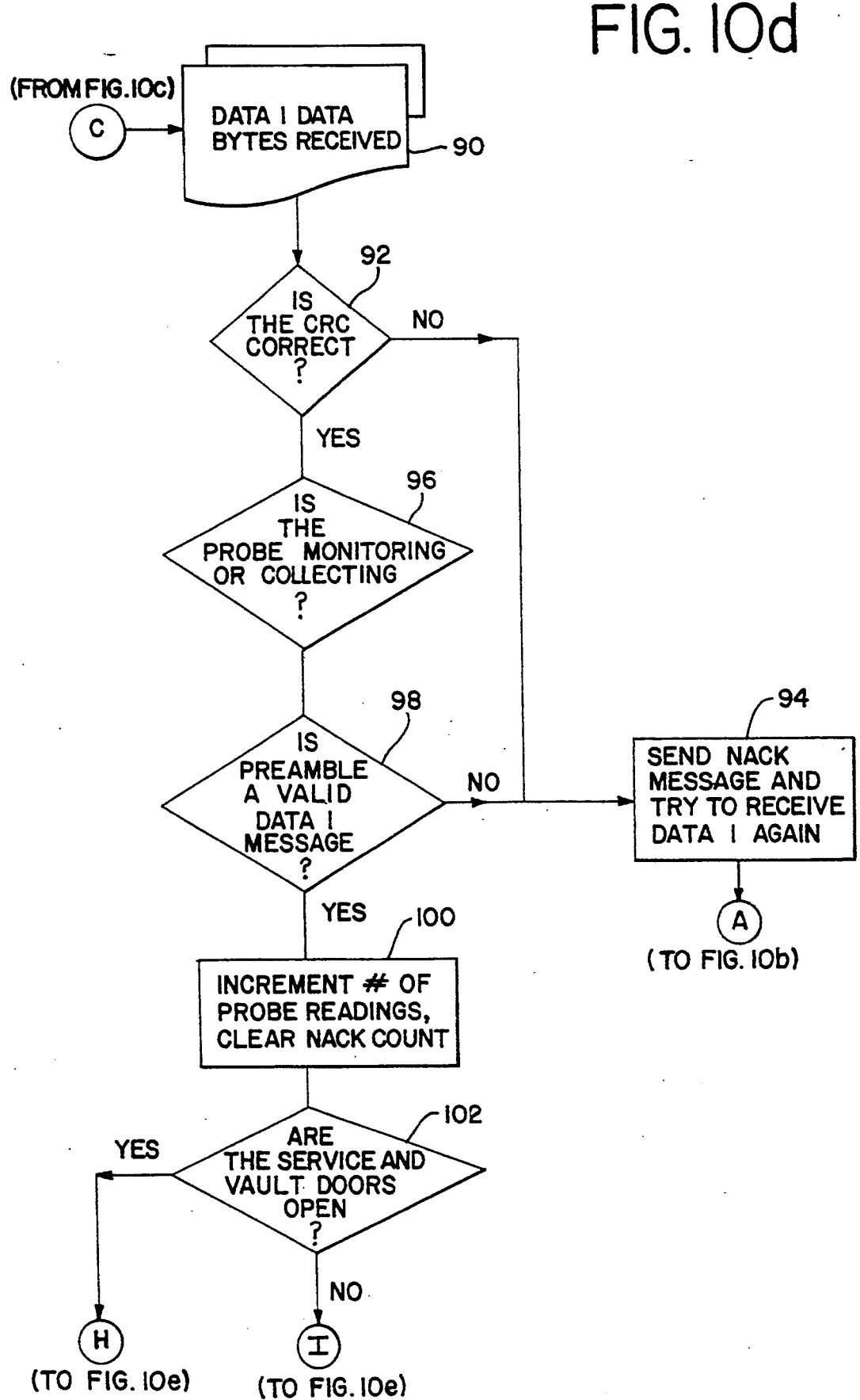
Figure 10E:
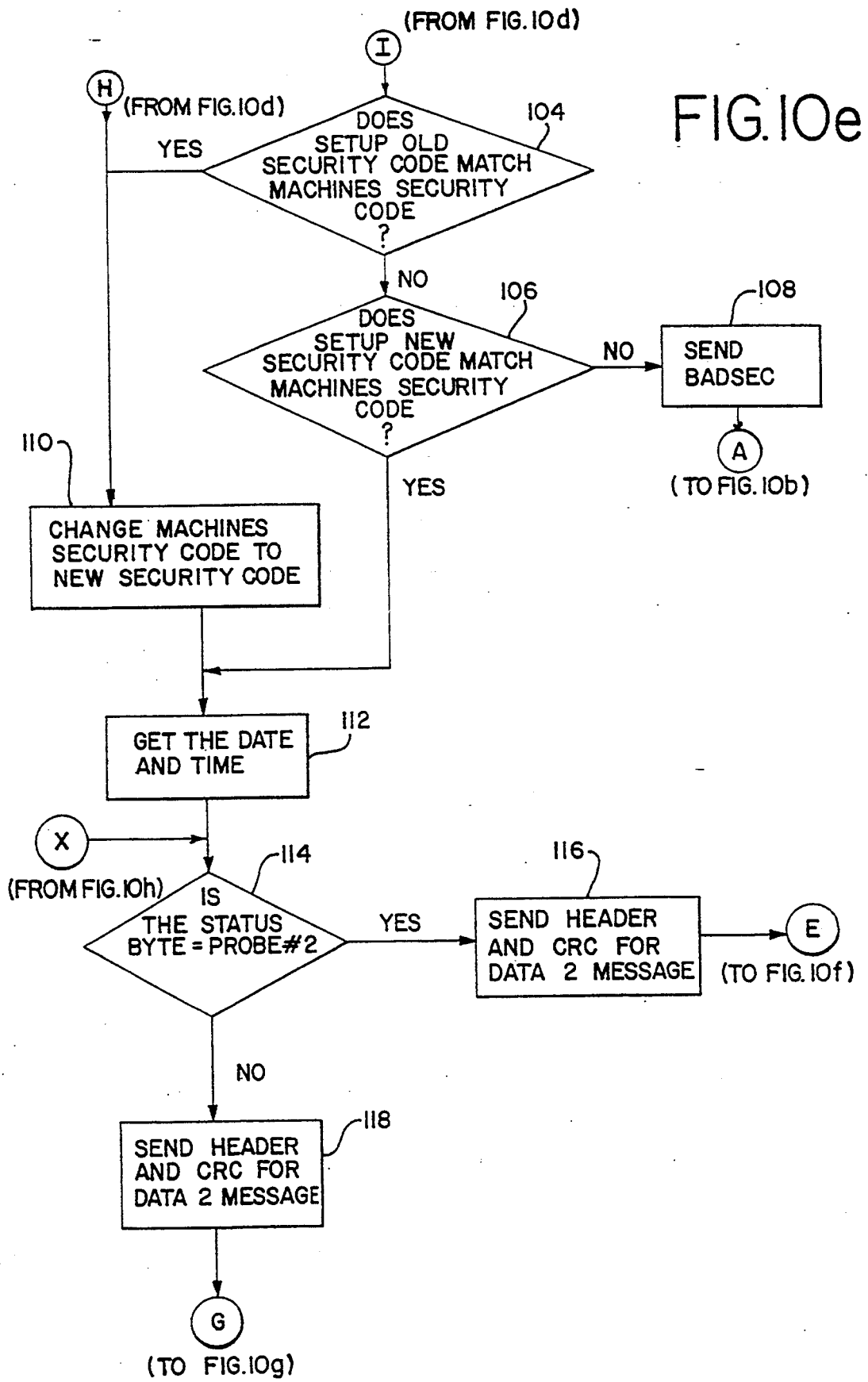
Figure 10F:
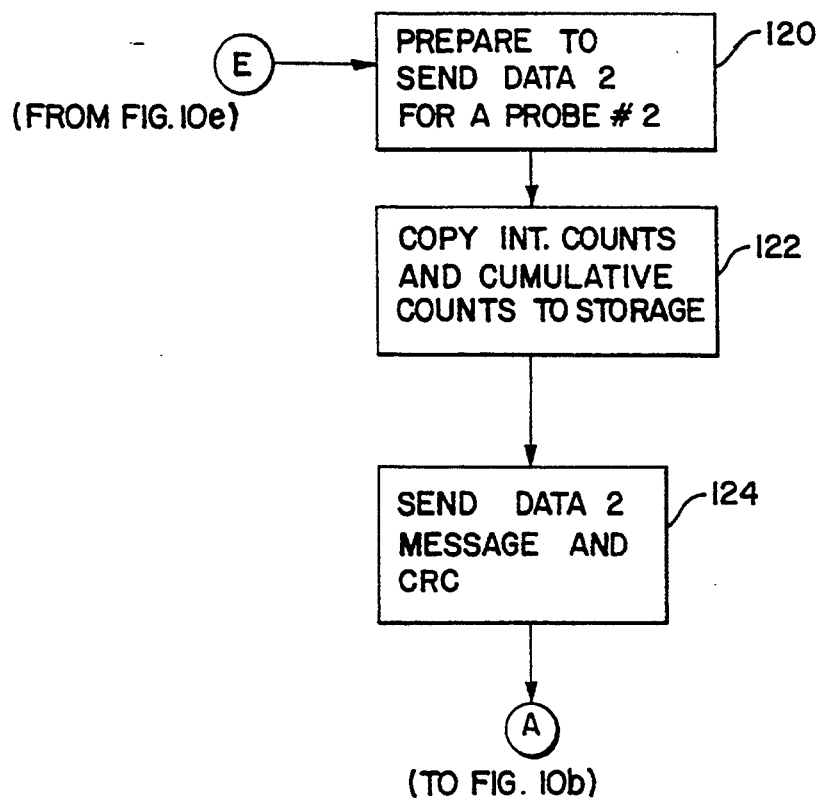
Figure 10G:
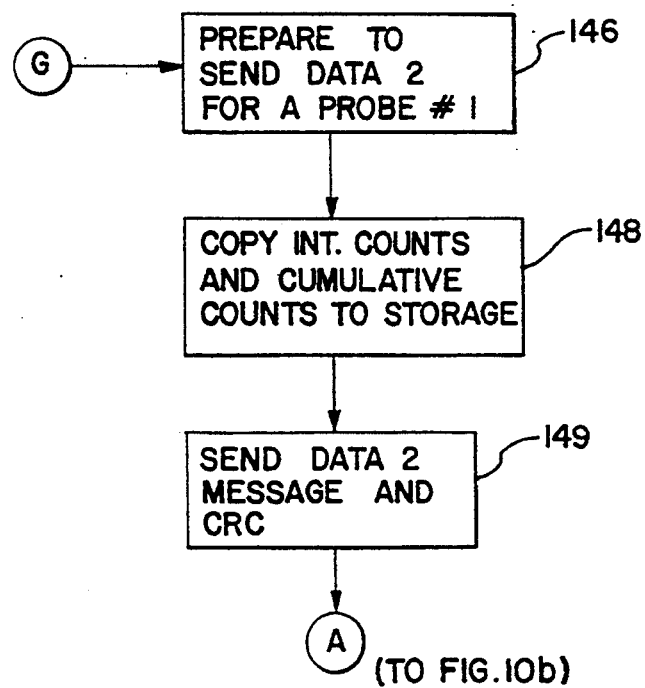
Figure 10H:
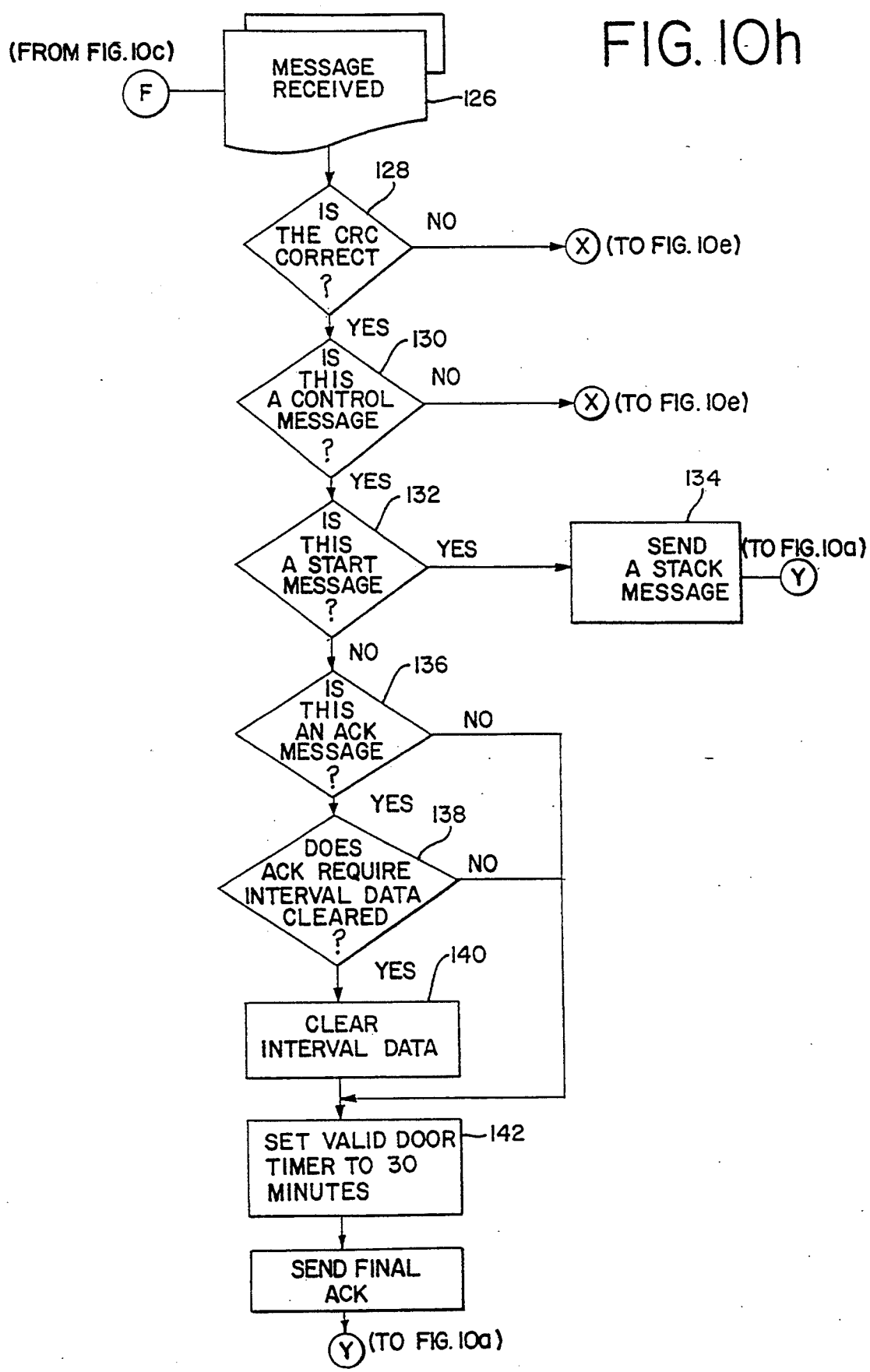
Figure 10H:
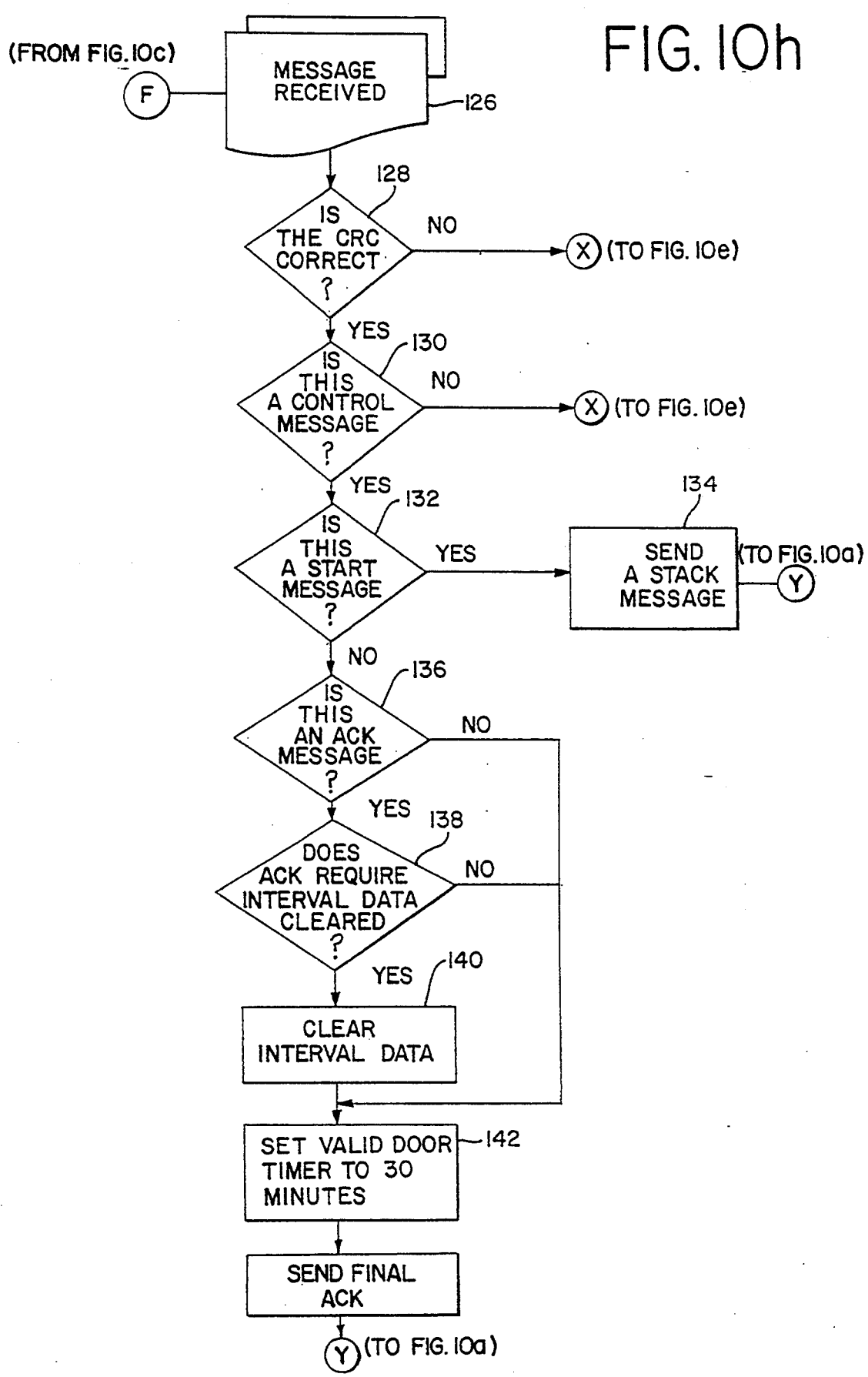
Figure 10J:
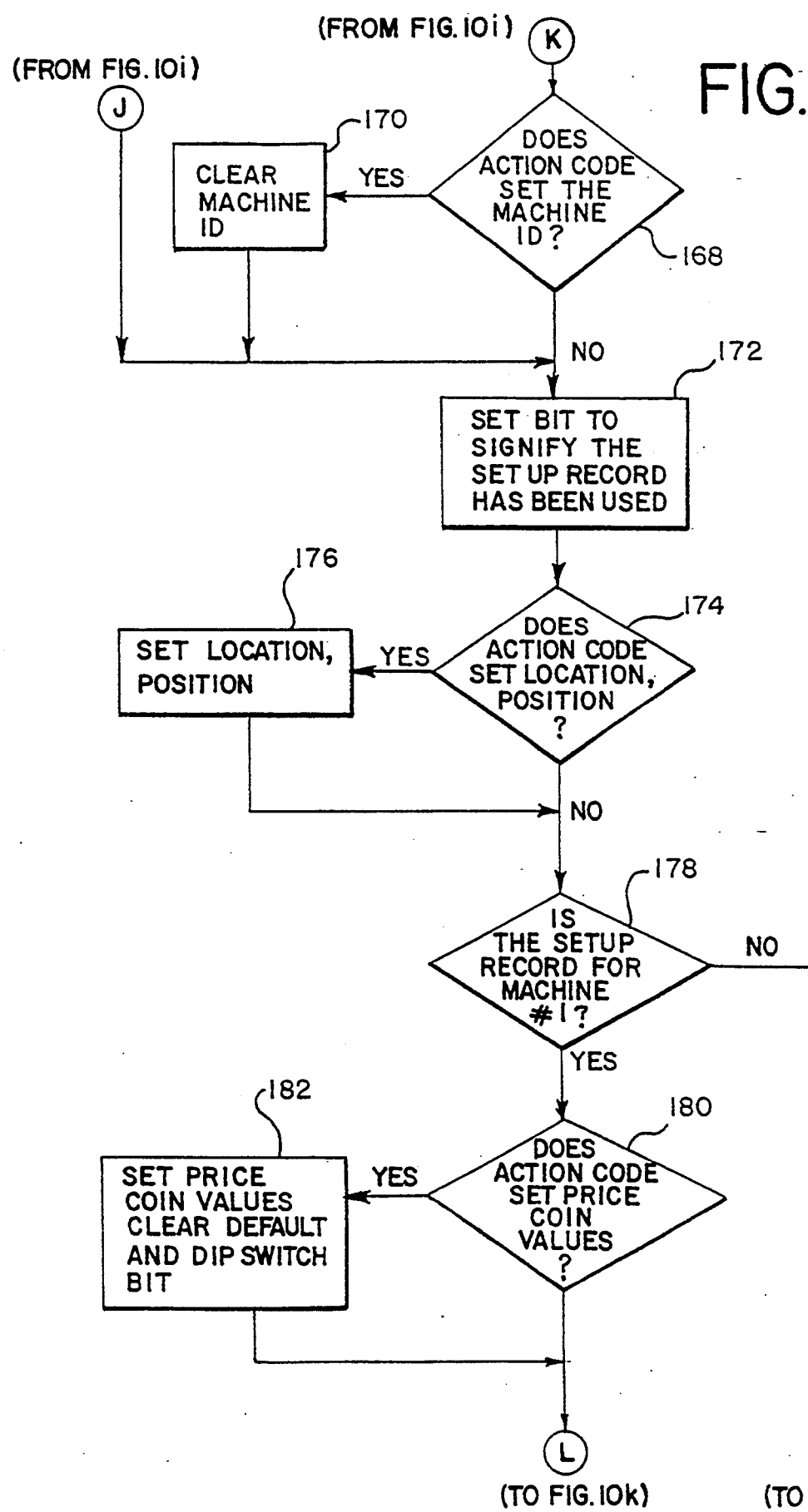

If the user selects the setup mode, immediately after the probe monitors the appliance, control is returned to unit 52 (FIG. 10a) and the probe sends a START message and the appliance replies by sending a STACK message. A SETUP DATA 1 message is then transmitted and unit 88 (FIG. 10c) passes control to unit 150 (FIG. 10i).

Unit 152 determines if there is an error in the setup message. If there is an error, control is passed to unit 154 which functions to transmit a NACK message. If the setup message does not have an error, control is passed to unit 156 which determines whether the setup message was received within one minute of the last valid communication took place. As described above, the probe preferably monitors the data unit before actually transmitting a setup record and thus receives information concerning the current setup and status of the appliance before sending the setup message. Security is thus provided in that it is determined whether the probe is authorized to setup the appliance by first checking security codes as described above. If the SETUP DATA 1 communication does not take place within one minute of the last valid communication, communications are terminated.

If the SETUP DATA 1 communication takes place within one minute of a previous valid communication, control is then passed to unit 158 which checks the file type of the record obtained by the probe from monitoring the data unit before transmission of the setup record. If the file type of the collection record does not match the file type of the setup record, a NACK message is transmitted by the appliance and the probe sends a new setup record.

If there is a match, control is then passed to unit 160 which determines whether the machine identification (id) is equal to zero. If the machine id is zeros then control is passed to unit 162 which determines if the action code authorizes the machine id of the setup record to be adopted. According to Table II, the setup machine id will be adopted if bit 0 of the action code is set. If bit 0 of the action code is set, control is passed to unit 164 and the setup machine id becomes the machine id.

If bit 0 of the action code is not set or the machine id does not equal zero, control is passed to unit 166 which determines if the machine id equals the setup machine id. If the ids do not match, then control is passed to unit 114 (FIG. 10e) which functions to send an appropriate DATA 2 message as described previously. If the ids match, control is passed to unit 168 (FIG. 10j) which determines if bit 0 of the action code is set. If bit 0 is set, control is passed to unit 170 which clears the machine id only if the ids match. Control is passed to unit 172 which sets bit 7 of the action code (Table III) to signify that the setup record has been used.

Figure 10K:
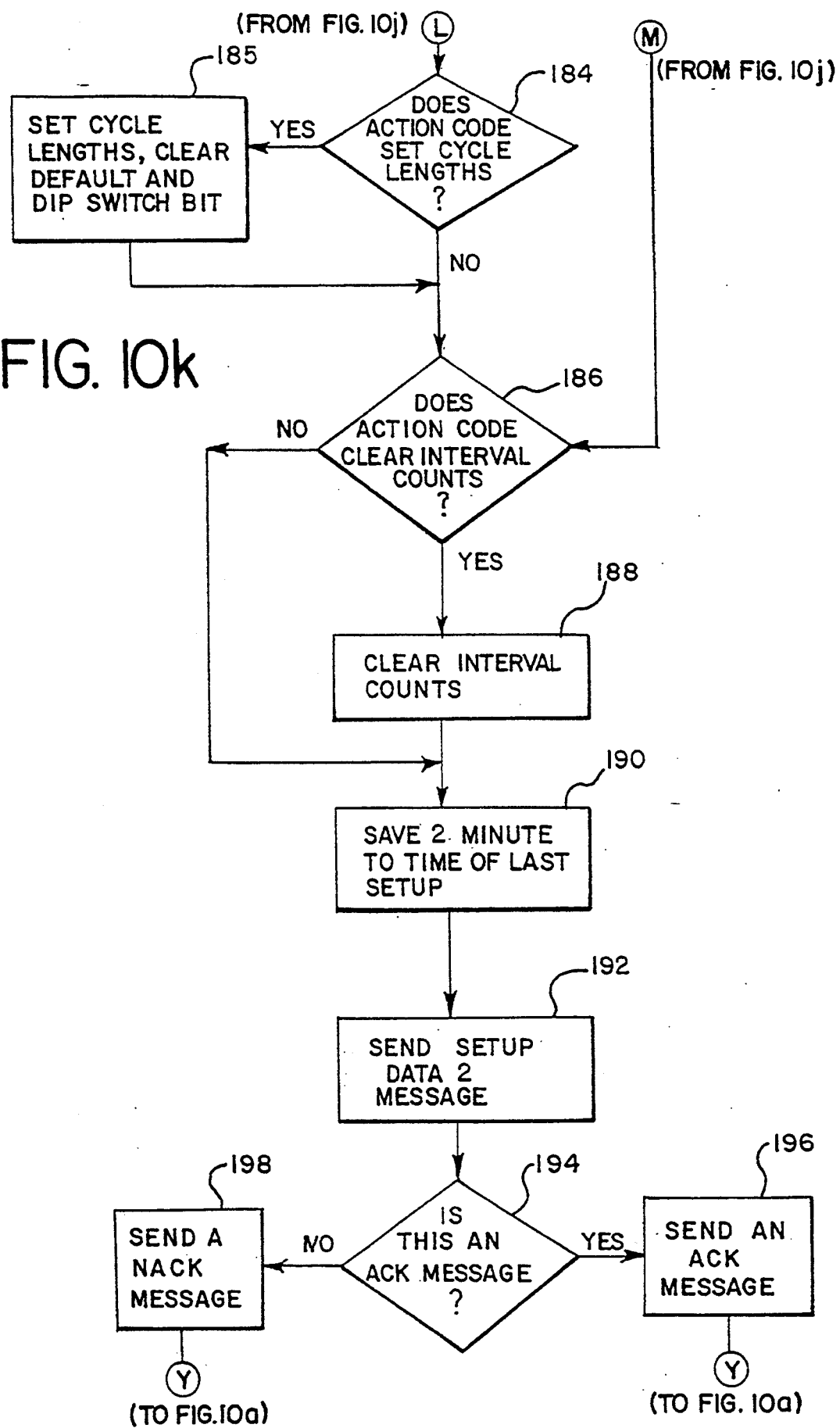

Control is then passed to unit 174 which determines whether the location and position parameters are to be set. These parameters will be set if bit 1 of the action code is set. If bit 1 of the action code is set, control is passed to unit 176 which sets the location and position parameters according to the setup record. Control is passed to unit 178 which determines whether the setup record is for a second data unit having a setup record illustrated in Table II above. If the setup record is not for a second data unit, control is passed to 186 (FIG. 10k). If the setup record is for a second data unit, control is passed to unit 180.

Unit 180 determines whether the price and coin parameters are to be set. These parameters will be set if bit 2 of the action code is set. If bit 2 of the action code is set, control is passed to unit 182 which sets those parameters accordingly. Otherwise control is passed to unit 184 (FIG. 10k) which determines whether the cycle parameters are to be set. These parameters will be set if bit 4 of the action code is set. If bit 4 of the action code is set, control is passed to unit 185 which sets those parameters accordingly. Otherwise control is passed to unit 186 which determines if bit 5 of the action code has been set. Bit 5 is set if the interval counts accumulated by the appliance are to be cleared. If bit 5 of the action code is set, control is passed to unit 188 which clears the interval counts. Control is passed to unit 190 which saves a two minute timer to remember the time of the last setup. Control is then passed to unit 192 and the appliance sends a SETUP DATA 2 message and CRC.

The data bytes of the SETUP DATA 2 message describe the appliance's newly created setup record. Control is then passed to unit 194 where it is determined if a received message is an ACK message. If it is, control is passed to unit 196 and the appliance responds by sending an ACK message and setup is complete. If the received message is not an ACK message, control is passed to unit 198 and the appliance sends a NACK message and the appliance sends a SETUP DATA 2 message again, and a CRC is sent by unit 192.

The source code for the communication protocol described is set out at the end of the detailed description before the claims.

While the present invention has been described with reference to an appliance and in particular a washer, those skilled in the art will appreciate that the present invention can be used in conjunction with many other devices which require configuration of the control board to control the operation of the device.

While the invention has been shown and described in connection with particular preferred embodiments, it is apparent that certain changes and modifications, in addition to those mentioned above, may be made by those who are skilled in the art without departing from the basic features of the present invention. Accordingly, it is the intention of the Applicants to protect all variations and modifications within the true spirit and valid scope of the invention.

© Maytag Corporation, 1992

```
*SERIAL COMMUNICATIONS INTERRUPT SERVICE ROUTINE          DAO *
*COMMENT: THIS ROUTINE STARTS THE CLOCK OSCILLATING           *
*         AGAIN WHENEVER IT GETS DONE FROM THE LAST TIME.     *
*         IT IS SET UP TO OSCILLATE AT 31.25 KHZ.             *
*         IT IS USED TO SEND START BITS AND 0 BITS.           *
***************************************************************
SCI     STA     SCIDAT      serial interrupt routine
        RTI
*****************END OF SCI************************************
***************************************************************
*COMMUNICATIONS INTERRUPT2 SERVICE ROUTINE                DAO *
*CALLED BY: TIMINT                                            *
*COMMENTS: THIS ROUTINE IS EXECUTED WHEN THE START BIT OF     *
*          EVERY BYTE IS RECEIVED. IT SETS UP THE TIMER       *
*          FOR 1/2 BIT TO MAKE SURE IT IS A START BIT AND     *
*          SETS UP OTHER PERTINENT DATA                       *
*          THE TX FLAG MEANS THAT BYTES ARE BEING             *
*          TRANSMITTED. MESS TELLS US WHAT MESSAGE HANDLER    *
*          WE ARE CURRENTLY ON. IF IT IS SET TO 0, COMMINT    *
*          WILL START OVER, LOOKING FOR THE FIRST MESSAGE.    *
*          THE COMM FLAG LETS THE TIMER INTERRUPT KNOW THAT   *
*          COMMUNICATIONS IS USING THE TIMER.                 *
***************************************************************
COMMINT LDA     #40
        STA     TDR         set timer for < 1/2 bit
        LDA     MESS        get message number
        BNE     COMM1       first message?
        INC     MESS        yes, point at next handler
        CLR     NACKCO      clear so NACK COUNT can use
        JSR     STDHED      set up for first header
        LDA     #170
        STA     WAITTI      170 ms to get START message
        LDA     #10         8 bits + start & stop
        STA     BIT
COMM1   BSET    COMM,FLAG1  signal communications
        BCLR    TX,FLAG1    we are receiving
        BSET    MASK,MISC   disable int2
        BCLR    7,TCR       clear pending timer ints
        RTI
******************END OF COMMINT*******************************
***************************************************************
```

```
*COMMUNICATIONS TIMER INTERRUPT SERVICE ROUTINE      DAO *
*CALLS: COINR, PWRCHK
*CALLED BY: TIMINT
*COMMENTS: THIS ROUTINE GETS CALLED BY THE TIMER INTERRUPT*
*          ROUTINE IF THE COMM FLAG IS SET. IT SENDS AND  *
*          RECEIVES EACH DATA BIT AND START AND STOP BITS.*
*          IT CALLS THE CRC, COIN DROP, AND POWER DOWN    *
*          ROUTINES. IT SETS UP THE TIMER FOR THE NEXT BIT*
*          OR JUMPS TO THE APPROPRIATE MESSAGE HANDLER.   *
*          A LOW INT2 PIN SIGNALS THE RECEIPT OF OPTICAL  *
*          ENERGY (START BIT OR 0 BIT).                   *
*          BIT = 9 : START BIT                            *
*          BIT = 1 TO 8 : DATA BITS                       *
*          BIT = 0 : STOP BIT                             *
*          BUFLEN : LENGTH OF BUFFER LEFT TO DO           *
*          RECPTR : CURRENT BYTE TO SEND OR RECEIVE       *
*          THE BYTE TO SEND IS ACTUALLY COPIED TO CRC3    *
*          FIRST SO THAT IT CAN BE ROTATED                *
***********************************************************

GETBIT   LDA    #104         set timer int. values
         ADD    TDR          for 833 us
         STA    TDR
         LDX    RECPTR       point at buffer
         DEC    BIT          look at next bit
         LDA    BIT
         BRSET  TX,FLAG1,TRANS  transmitting?
***********************************************************
*RECEIVING                            DAO                 *
*COMMENTS: IF A BIT IS TO BE RECEIVED THIS ROUTINE        *
*          GETS EXECUTED.                                 *
***********************************************************
GETBI1   BEQ    BYTEDN       no, done with 8 bits?
         CMP    #09          no
         BEQ    ABORT2       startbit? yes, check startbit
GETBI2   BRCLR  INT2,PORTD,GETBI3 no; data bit is in carry flag
GETBI3   ROR    ,X           rotate data right into MSB
***********************************************************
*COMPUTE CRC16                        DAO                 *
*COMMENTS: THE CARRY BIT, CRC3(TX) SHOULD ALREADY HOLD    *
*          THE DATA BIT. IT COMPUTES THE CRC16 ONE BIT    *
*          AT A TIME (EVERY INTERRUPT). IT ROTATES THE    *
*          CRC FROM CRC2 TO CRC1, EXCLUSIVE ORS THE BIT   *
*          SHIFTED OUT WITH THE DATA BIT, AND IF THE      *
*          RESULT IS 1 EXCLUSIVE ORS THE CRC WITH $A001.  *
***********************************************************
CRC16    LSR    CRC2         rotate crc2
         ROR    CRC1         rotate crc1
         ROR    A            put data into msb of A
         EOR    ,X           check data bit(CRC3 when tx,
;                             RECPTR when receiving)
         BPL    CRCEXI       IS RESULT 1? MSB = 1?
         LDX    #CRC1        Y, USE X TO SAVE A BYTE
         LDA    ,X           YES, EXCLUSIVE OR WITH $A001
         EOR    #$01
         STA    ,X
         INC    X            POINT AT CRC2
         LDA    ,X
         EOR    #$A0
         STA    ,X
*********************END OF CRC16**************************
```

```
CRCEX1   LDA    BIT          check to see if time to
         CLR    X            debounce coin drop X
         AND    #03          look at bottom 2 bits
         SUB    #02          if 2 or 6, do first coin drop
         BEQ    EXIT1
         INC    X            second coin drop
         DEC    A            if 3 or 7, do second coin drop
         BNE    EXIT
EXIT1    JSR    COINR        CHECK COIN DROP X FOR COIN
EXIT     JMP    PWRCHK       CHECK FOR POWER FAILURE
```

```
***************************************************
*BYTE DONE                                         *
*COMMENTS: EXECUTE THIS WHEN DONE RECEIVING OR SENDING *
*          A BYTE. JUMPS TO APPROPRIATE HANDLER.   *
*          HEAD3-HEAD5 ARE USED AS THE JUMP AREA.  *
***************************************************
BYTEDN   BCLR   C1,PORTC     turn off led
BYTEDN2  LDA    #10
         STA    BIT          prepare for next byte
         INC    RECPTR       point at next byte storage
         DEC    BUFLEN       done with 1 more byte
         BEQ    BYTEDN3      done with all bytes this message?
         BRSET  TX,FLAG1,WAITR2  no, don't start comm ints if
         BRA    WAITRE       transmitting
BYTEDN3  LDX    MESS         GET NUMBER OF HANDLER
         INC    MESS         POINT AT NEXT HANDLER
         CPX    #40          CHECK VALIDITY OF MESS
         BHS    ABORT1       IS MESSAGE OUT OF RANGE?
         LDA    #$CC         N,OPCODE FOR JUMP INSTRUCTION
         STA    HEAD3
         LSL    X            EVERY JUMP TAKES 2 BYTES
         LDA    TABLE-2,X    STORE ADDRESS INTO RAM
         STA    HEAD4
         LDA    TABLE-1,X
         STA    HEAD5
         JMP    HEAD3        JUMP TO RAM, THEN TO HANDLER
*****************END OF BYTE DONE*******************
****************************************************
*TRANSMIT                    DAO                   *
*COMMENTS: IF THE BIT IS TO BE TRANSMITTED THIS ROUTINE *
*          IS BRANCHED TO.                         *
****************************************************
TRANS    BEQ    STOPBI       stop bit?
         CMP    #$09         no
         BEQ    STARTB       start bit?
         LDX    #CRC3        no, point at crc3 for
         LSR    ,X           crc routine
         BCC    SETSCI       output a 0?
         BSET   7,CRC3       no, set data flag for crc
         BSR    STOPCLK      STOP THE SERIAL PORT CLOCK
         BRA    CRC16
SETSCI BSR    STRTCLK      start the serial port clock
;        the msb of CRC3 is already 0 for crc16
TRANS1   BRA    CRC16
```

```
********************END OF TRANSMITTING********************
ABORT2   BRCLR  COMCH1,FLAG2,ABORT3 IN CONTINUOUS CYCLE?
         BSR    STOPCLK    Y, END TEST. DISABLE SCI INTS
         BCLR   COMCH1,FLAG2 DONE WITH COMM CHECK
         BRSET  INT2,PORTD,ABORT1 DOES RECEIVER WORK?
         LDA    #$05       Y, BLINK MORE COINS LIGHT
         STA    LEDTMR     LENGTH OF TIME
         CLR    BLINKR     NO BLINK
         BSET   LED,FLAG2  MAKE SURE IT STARTS ON
         BSET   C1,PORTC   MANUALLY TURN IT ON
*                          IT IS RESET IN TIMER INT EVERY MS
         LDA    #25
         STA    TDR
         BRA    ABORT1
ABORT3   BRCLR  INT2,PORTD,EXIT if bad startbit abort
         BRA    WAITR1     make comm wait for 180 ms
MESS12
*  THE ACK HAS BEEN SENT, SO TERMINATE COMMUNICATIONS
ABORT1   CLR    MESS       start over
*  THIS ROUTINE SETS EVERYTHING UP TO WAIT FOR THE NEXT START BIT
WAITRE   BCLR   MASK,MISC  enable comm interrupts
WAITR1   BCLR   COMM,FLAG1 tell timer interrupt we aren't ready
WAITR2   BCLR   REQUES,MISC clear pending comm interrupts
         RTI
*************************************************************
*START BIT ROUTINE WHEN TRANSMITTING                     DAO *
*COMMENTS: THIS ROUTINE STORES THE CURRENT RECEIVE           *
*          POINTER DATA INTO CRC3 AND STARTS SENDING         *
*          THE START BIT.                                    *
*************************************************************
STARTB   LDA    ,X         get data and
         STA    CRC3       store it where we can change it
         BSR    STRTCLK    start serial clock
         RTI
************END OF START BIT WHEN TRANSMITTING**************
*********SUBROUTINE TO START THE SERIAL PORT CLOCK**********
STRTCLK  BCLR   5,SCISTS   enable sci interrupts
         BSET   5,SCICTL   enable clock
         STA    SCIDAT     start serial clock
         RTS
*************************************************************
*   STOP BIT WHEN TRANSMITTING
STOPBI   BSR    STOPCLK    disable sci interrupts
         BSET   C1,PORTC   turn on the led when transmitting
         BRA    BYTEDN2
****************END OF STOP BIT*****************************
*********SUBROUTINE TO STOP THE SERIAL PORT CLOCK***********
STOPCLK  LDA    #$05       SCI CONTROL REG CLK 30K HZ
         STA    SCICTL     AND DISABLE SCI CLOCK
         LDA    #$30       SCI INTERRUPT AND TIMER2
         STA    SCISTS     ABD DISABLE SCI INTERRUPTS
         RTS
*************************************************************
*START MESSAGE RECEIVED                                  DAO *
```

```
*SET UP TO SEND STACK MESSAGE                                        *
*********************************************************************
* MESS1C
;         LSR     MESS         CONVERT MESS=5 (0101) TO
*                              MESS=2 (0010)
MESS1     JSR     CHECRC       START received
          BCS     WAITR1       don't allow comm until waitti=0
;         BCS     ABORT1
          LDA     HEAD1
          CMP     #ENQ         make sure first byte is proper value
          BNE     WAITR1       is first byte a collection header?
MESS1B    LDA     #START       yes
          CMP     HEAD2        check second byte for start value
          BNE     WAITR1       is second byte OK?
MESS1A    INC     HEAD2        CONVERT #START(06) TO #STACK(07)
;         LDA     #STACK       yes
;         STA     HEAD2        next message is a STACK message
          BRA     STDTX        do standard transmitting MESS22    LDA     #12          send crc for final ACK
          STA     MESS         mess12 is abort1
MESS2
*                 send crc for STACK & NACK
MESS7
*                 send crc for BADSC header
MESS10
*                 send crc for BADSC data
MESS19
*                 send crc for DATA2 data
MES 24
*                 send crc for SETUP DATA2 header
MESS26
*                 send crc for SETUP DATA2 data
MESS13
MESS29
*                 send crc for DATA2 header
*         This sends the crc in bytes HEAD7 & HEAD8
          LDX     #HEAD7       RECPTR
          LDA     CRC1         send CRC16 subroutine
          STA     ,X
          LDA     CRC2
          STA     HEAD8
          LDA     #$02         BUFLEN
          BRA     TRET3

MESS20
*                 set up for ACK or NACK
          BCLR    CNTCLR,STATS1 counts have not been cleared
MESS27
*                 set up for SETUP ACK
MESS3     JSR     STDHED       set up for DATA1 header
          CLR     WAITTI       wait for 255 ms
          INC     NACKCO       increment NACK COUNT
          LDA     #20
```

```
            CMP   NACKCO       20 nacks?
            BEQ   ABORT1       yes, abort
            BRA   WAITRE       no, wait to receive
************************************************************
*DATA 1 HEADER RECEIVED                                     *
*CHECK TO SEE IF IT IS A SETUP OR NORMAL DATA1              *
************************************************************
MESS4       LDA   HEAD1        DATA1 header received
;           CMP   #ENQ         start message again?
;           BEQ   MESS1C       y, send STACK again
MES 4B      CMP   #DLE
            BEQ   MESS4Z       is first byte a setup header?
MESS4A      INC   MESS         no; message 5 is skipped
            LDA   #15          set up for DATA1 sec. codes,
            LDX   #OLDSC3      read date and time. 2 bytes are
TRET3       JMP   RETURN       serial # of probe
************************************************************
*RECEIVED SETUP DATA1 HEADER                                *
*COMMENTS: SET UP TO RECEIVE DATA1 DATA                     *
************************************************************
MESS4Z      LDA   HEAD2        received SETUP DATA1 header
            CMP   #SETSIZ      is it maytag's size?
            BHS   MESS4Y       branch if it is equal or larger
            CMP   #CCSSIZ      IS IT CCC'S SIZE?
            BNE   NACKO        NO,
            CLR   HEAD1        NO EXTRA BYTES
            BSET  CCCSET,FLAG1 signify ccc setup
*                              A holds #CCSSIZ (BUFLEN)
            LDX   #CRECTY      RECPTR
            BRA   TRET3
*                 set up for MAYTAG SETUP DATA1 data
MESS4Y      SUB   #SETSIZ      GET NUMBER OF EXTRA BYTES
            STA   HEAD1
            BCLR  CCCSET,FLAG1 signify maytag setup
            LDA   #SETSIZ      BUFLEN
            LDX   #TRECTY      RECPTR
            BRA   TRET3
************************************************************
*RECEIVED SETUP DATA1, GET EXCESS BYTES                     *
************************************************************
MESS5       LDX   #HEAD7       RECPTR - USE HEAD7 FOR DUMMY BYTE
            DEC   HEAD1        each time this gets one byte
            BMI   MES5A
            DEC   MESS         do this routine again next time
            LDA   #01          BUFLEN
            BRA   TRET3
************************************************************
*RECEIVE CRC FOR SETUP DATA1                                *
************************************************************
MES5A       LDA   #23          message 23 is next
            STA   MESS
            LDA   #02          BUFLEN
            BRA   TRET3
```

```
***************************************************
*SEND A NACK                                       *
***************************************************
NACK0     LDA    #02         next message is 2
          STA    MESS        go back to message 2 after this
*         LDA    #NACK       #NACK = 2 ALREADY
          STA    HEAD2
          LDA    #ENQ        and try to receive DATA1 again
          STA    HEAD1
*                            do standard transmitting stuff
***************************************************
*STANDARD TRANSMITTING ROUTINE                     *
*COMMENTS: USED TO SAVE CODE.  SET THE TIMER FOR 2 STOP *
*          BITS BETWEEN RECEIVING AND SENDING      *
***************************************************
STDTX     JSR    STDHD1      setup BUFLEN & RECPTR
          LDA    #CLEAR      for 6 bytes at HEAD1
          STA    HEAD6
STDTX1    BSET   TX,FLAG1    we will be transmitting
          RTI
***************************************************
*SEND A DATA2 BAD SECURITY CODE HEADER             *
***************************************************
BADSEC    LDX    #04         4 BYTES IN MESSAGE, PUT IT INTO
          JMP    MESS6C      DATA LENGTH LOW OF HEADER(HEAD2)
***************************************************
*DATA1 SECURITY CODES, DATE, TIME, AND PROBE SERIAL *
*NUMBER RECEIVED.                                  *
***************************************************
MESS6     JSR    CHECRC
          BCS    NACK0
* IF MEQID < 5000 AND NO ACK RECEIVED, CLEAR INT COUNTS
* IF IT IS A COINAMATIC RECORD
          BCLR   COLL,FLAG3  PRESET THE COLLECTOR MEQ FLAG
          LDA    MEQID2
          CMP    #$50        IF MEQID<5000 ITS A COLLECTOR
          BHS-   MESS6V
          BSET   COLL,FLAG3
MESS6V    LDA    HEAD1
          CMP    #$82        check for supplemental char.
          BEQ    MESS6U
          CMP    #SOH        check for SOH character
          BNE    NACK0
MESS6U    CLR    NACKCO      clear for next time
          INC    NUMPR       increment number of probe readings
          BRCLR  SERV,STATS2,MESS6B if service and vault doors
          BRSET  VAULT,STATS2,GETNEW are open, security passes
MESS6B    LDA    SECCO1      if zero. accept new sec. code
          ORA    SECCO2
          ORA    SECCO3
          BEQ    GETNEW
          LDX    #03         check old security code
MESS6S    LDA    SECCO1-3,X
          CMP    OLDSC1-3,X  does it match?
```

```
              BNE     CHENSC    if not, check new sec. code
              DEC     X
              BNE     MESS6S
              BRA     GETNEW    if yes, get new sec. code
CHENSC        LDX     #03       check new sec. code
MESS6R        LDA     SECC01-3,X
              CMP     NEWSC1-3,X does it match?
              BNE     BADSEC    if not, send bad sec. message
              DEC     X         if yes, continue
              BNE     MESS6R
GETNEW        LDX     #03       get new sec. code
GETNE1        LDA     NEWSC1-3,X
              STA     SECC01-3,X
              DEC     X
              BNE     GETNE1
*       get the date and time now
*       convert BCD to binary first
GETTI2        LDX     #RD5M     start at minutes
GETIME        CPX     #RD1M     go until done at months
              BLO     DAYOF     if done, jump
              LDA     ,X        get hex data
              AND     #$0F      get ones of data
              STA     BUFLEN    store for later
              LDA-    ,X        get hex data again
****************************************************************
* MULTIPLY BY 10 ROUTINE                                        *
* COMMENTS: IT DESTROYS THE CONTENTS OF CRC3                    *
****************************************************************
              AND     #$F0      get tens of data
              LSR     A         shift tens digit to get
              STA     CRC3      A*8, put it in CRC3
              LSR     A
              LSR     A         get A*2
              ADD     CRC3      add A*2+A*8=A*10
****************************************************************
              ADD     BUFLEN    add ones digit to it
              STA     ,X        store it back
              DEC     X         next date byte
              BRA     GETIME    loop
****************************************************************
*                    12/6/89              Doug Ochsner
*
* This program computes the day of the week from a given
*month, day, and year. It is based on the fact 1 day is gained
*each normal year, and 2 days are gained during leap years.
*Jan. and Feb. are considered part of the prior year to make
*leap years easier to handle. It is taken from Zeller's
*Congruence (Dr. Dobb's, October 1990). It is simplified
*since we don't care about dates outside of the next 80 years.
*Zeller says: c=century(19)
*             y=year(90)
*             d=day or the month
*             m=month, but if month < 3 then month =
*                       month + 12 and year = year -1
*dayofweek = (d + ((m+1)*26)/10 + y + y/4 + c/4 + 5*c) MOD 7

*Simplifying, we know that c = 19, so 19/4 + 5*19= 99 MOD 7 = 1.
*This offset can be added to the offset for each month that
*may be in a lookup table to eliminate multiplying and dividing.
*The equation reduces to:
```

```
*dayofweek = (d + (monthoffset+1) + y + y/4) MOD 7.
*The day is referenced to 1900 or 1961 or 1989, which
*had first days of Sunday. Sunday is day 0, Monday is
*day 1, Saturday is day 6, and so forth.
*
*EXAMPLE IN C:

*int dayarr[13] = *0,1,4,3,6,1,4,6,2,5,0,3,5*;
*if(year < 61) year = year + 100;
*if(month < 3) year = year -1;
*A = year
*day = A;
*B = A>>2;
*day = day + B;
*D = dayarr[month];
*day = day + D;
*E = dayofmonth;
*day = day + E;
*       /* day of week = remainder of days/7 = days mod 7 */
*day = day % 7;
```

```
DAYOF   LDA    RD3Y       tens of years
        CMP    #61
        BHS    DAY1       year less than 89?
        ADD    #100       yes, add 100 so it is in the 21st century
DAY1    LDX    RD1M       if after Feb., make it prior year
        CPX    #02
        BHI    DAY3
        DEC    A
DAY3    STA    RD3Y
        LSR    A          get the number of leap years
        LSR    A
        ADD    TABLE1-1,X add day offset for month
        ADD    RD3Y
        ADD    RD2D       add the day of the month

*       MOD 7 ROUTINE
GETREM  CMP    #07        get days mod 7
        BLO    GETRE1
        SUB    #07
        BRA    GETREM
GETRE1  CLR    X
        SEC               this will go into X
;                         A holds remainder of division
DAY2    ROL    X          set appropriate day bit
        DEC    A
        BPL    DAY2       not on correct bit yet
        STX    DAYDAY     store result (day)

BCLR   0,RD5M     don't use LSB of minutes
        LDA    DAYMIN     get the LSB of DAYMIN
        AND    #01        so it increments the 2
        ORA    RD5M       minute ticker correctly
        STA    DAYMIN     get minutes
        LDA    RD4H       get hours
        STA    DAYHR
****************END OF DATE AND TIME*********************
*     check for CCC or MAYTAG byte, and set the CCCB flag  *
*     if it is CCC                                         *
***********************************************************
```

```
          BSET    CCCB,FLAG1  preset CCC record
          LDA     HEAD6
          CMP     #$5A        does it want ccc?
          BEQ     MESS6A      if so, branch
          BCLR    CCCB,FLAG1  it wants maytag
MESS6A    LDA     #13         preset for maytag DATA2 header
          LDX     #COLSIZ     message 13 is next
          BRCLR   CCCB,FLAG1,MESS6D
          LDA     #29         set for ccc DATA2 header
          LDX     #CCCSIZ     message 29 is next
MESS6D    STA     MESS        adjust message pointer to 13
MESS6C    LDA     #SOH
MESS6E    STX-    HEAD2       store size of DATA2 data
          STA     HEAD1
          JSR     STDHD1      setup BUFLEN & RECPTR
          BSET    7,HEAD3     it was cleared in STDHD1,
*                             set to signal last message
          JMP     STDTX1      do standard transmitting stuff

************************************************************
*SEND THE RECORD TYPE FOR CCC DATA2 AND BADSC MESSAGES      *
************************************************************
MESS30    LDA     #32         CCC DATA2 record type
          BRA     MESS8A
MESS8     LDA     #98         send BADSC record type
MESS8A    LDX     #RECTY      RECPTR
          STA     ,X
          LDA     #01         BUFLEN
          BRA     TRET1
************************************************************
*SEND BADSC MACHINE ID                                      *
************************************************************
MESS9     LDA     #03         BUFLEN
          LDX     #MACN3      RECPTR
          BRA     TRET1
************************************************************
*BADSC SENT, QUIT COMMUNICATIONS AND GO TO SLEEP            *
************************************************************
MESS11    CLR     MESS
          BSET    SLEEPF,FLAG1
          LDA     #60
          STA     SLEEPT      go to sleep for 60 seconds
          BSET    MASK,MISC   disable communication interrupts
          JMP     WAITR1

*****ALWAWS DOUBLE CHECK THIS******
************************************************************
*START SENDING MAYTAG DATA2 DATA                            *
*STARTING WITH: RECORD TYPE                                 *
*ENDING WITH: COIN2 SETTING,FACTORY1,FACTORY2, 2 UNUSED     *
*BYTES: 24                                                  *
************************************************************
MESS14    CLR     COIN1S      CLEAR OUT UNUSED BYTES
          CLR     COIN2S      TO MAKE SURE THAT FUTURE
          CLR     MINRI       MEQ AND PC SOFTWARE WILL NOT
          CLR     NUMRI       CRASH IF THEY ARE NON-ZERO
          CLR     WCL
          LDA     FEAT        CLEAR UNUSED BITS
          AND     #03
          STA     FEAT
          BRSET   DRYER,FLAG1,MES14A
```

```
           CLR    SDCL
           CLR    RDCL
MES14A     LDA    #26
           LDX    #RECTY    RECPTR
           STA    ,X        record type 26; send up to
           LDA    #28       cumulative counts (BUFLEN)
           BRA    TRET1
```

```
****************************************************************
*SEND MORE MAYTAG DATA2 DATA                                    *
*STARTING WITH: SOFT CUM REGULAR CYCLES                         *
*ENDING WITH: INTERVAL AUTHORIZED VAULT OPENINGS                *
*BYTES: 35                                                      *
*COMMENTS: THE CUMULATIVE COUNTS ARE COPIED TO TEMP             *
*          STORAGE AT HEAD1 TO MAKE SURE THEY ARE NOT           *
*          MODIFIED WHILE BEING SENT. THE INTERVAL              *
*          COUNTS ARE COPIED TO HEAD1+19 TO                     *
*                                        MAKE SURE THEY ARE     *
*          NOT MODIFIED WHILE BEING SENT AND NOT MODIFIED       *
*          BEFORE THE COUNTS THAT ARE SENT ARE SUBTRACTED       *
*          FROM THE COUNTS WHEN THEY ARE TO BE CLEARED          *
*          4 BYTES AT HEAD1+15 WERE UNUSED, BUT NOW             *
*          2 ARE USED FOR THE POSSUM MODE COUNT                 *
*                                                               *
****************************************************************
MESS15     BSR    SUB15     COPY INTERVAL COUNTS TO
*                           TEMP STORAGE.
           LDX    #19       19 bytes of cum counts
MES15A     LDA    HCRC2-1,X copy cum counts to temp
           STA    HEAD1-1,X
           DEC    X
           BNE    MES15A
           CLR    HEAD1+17  CLEAR UNUSED BYTES
           CLR    HEAD1+18
           LDA    #19+12    located in temp storage
           LDX    #HEAD1    HEAD1 is first byte of
           BRA    TRET1     temp storage
*                           previous 4 bytes are unused random bytes
****************************************************************
* SUBROUTINE TO COPY INTERVAL COUNTS TO TEMP STORAGE            *
* SO THAT BOTH MAYTAG AND CCC CAN USE IT                        *
****************************************************************
SUB15      LDX    #12       12 bytes
SUB15A     LDA    IRPC2-1,X make sure they are not
           STA    HEAD1-1+19,X incremented between sending
           DEC    X         them and clearing them
           BNE    SUB15A    and just while sending them
           RTS
****************************************************************
*SEND MORE MAYTAG DATA2 DATA                                    *
*STARTING WITH: TIME OF LAST SERVICE DOOR OPENIGN HIGH          *
*ENDING WITH: PREVIOUS SPECIAL PRICE CYCLES LOW                 *
*BYTES: 25                                                      *
****************************************************************
MESS16     LDA    #25       send event time info for
           LDX    #TLSD2    DATA2 data (RECPTR)
           BRA    TRET1
```

```
****************************************************************
*SEND MORE MAYTAG DATA2 DATA : LENGTHS OF POWER DOWNS           *
*STARTING WITH: LAST POWER DOWN                                 *
*ENDING WITH: PREVIOUS POWER DOWN                               *
*BYTES: 4                                                       *
*COMMENTS: THESE FIELDS DO NOT HAVE ANY REGISTERS               *
*          DEDICATED TO THEM SO USE HEAD3 THRU HEAD6            *
*          FILLED WITH ZEROES.                                  *
****************************************************************
MESS17    LDA    #04       BUFLEN
          LDX    #HEAD3    RECPTR
          JSR    STDHD4    fill with zeroes and set pointers
          RTI
****************************************************************
*FINISH SENDING MAYTAG DATA2 DATA: STATUS & DIAG. CODES         *
*STARTING WITH: STATS1                                          *
*ENDING WITH: DIAG3                                             *
*BYTES: 5                                                       *
*COMMENTS: THE CRC IS SENT NEXT                                 *
****************************************************************
MESS18    LDA    #05       send status & diag. codes
          LDX    #STATS1   RECPTR
TEST1     JMP    RETURN

****************************************************************
*RECEIVED ACK OR NACK FOR DATA2                                 *
*COMMENTS: ALL OF THE INTERVAL COUNT CLEARING(SUBTRACTING)      *
*          MUST BE DONE HERE.                                   *
****************************************************************
MES21E    JMP    MES86A
MES21D    JMP    MES81
MESS21    BSR    CHECRC    received ACK or NACK
          BCS    MES21E
          BCLR   COLL,FLAG3 SIGNAL TO SEND ACKNOWLEDGE
          LDA    HEAD1
          CMP    #ENQ      correct type?
          BNE    MES21E    if not, branch and send DATA2 again
          LDA    HEAD2
          CMP    #START
          BEQ    MES21D    do stack message again if start
          CMP    #ACK      acknowledge?
          BEQ    MES21Y    yes, finish comm
          CMP    #08
          BNE    MES21E
          BRA    MES21A
MES21Y    LDA    HEAD6
          CMP    #CLEAR
          BNE    MES21A    clear all interval data?
* TIMINT JUMPS HERE IF ACK NOT RECEIVED AND THE
* MEQ ID < 5000. NOW USE COLL,FLAG3 TO TELL US
* WHETHER TO SEND ANOTHER ACKNOWLEDGE
MES21Z    BSET   CNTCLR,STATS1 counts have been cleared
          LDX    #04       yes, subtract 2 byte counts that
MES21B    LDA    IRPC2-1,X were sent from temp storage
          SUB    HEAD1+19-1,X from actual counts
          STA    IRPC2-1,X
          DEC    X         done with low byte
          LDA    IRPC2-1,X also do high byte
          SBC    HEAD1+19-1,X HEAD1+19 is first byte of
          STA    IRPC2-1,X interval counts
          DEC    X
```

```
         BNE      MES21B
         LDX      #08           now do 1 byte counts starting
MES21H   LDA      INR-1,X       with INR--corresponds with
         SUB      HEAD1+19+4-1,X this address
         STA      INR-1,X       19 bytes of cums,
         DEC      X             4 bytes of 2 byte counts
         BNE      MES21H
*** COINAMATIC DOESN'T CLEAR TIME STAMPS ***
;        LDX      #TLSD2        clear time stamps starting here
;MES21C  CLR      ,X
;        INC      X
;        CPX      #TLSET3       and here
;        BNE      MES21C
         LDA      RP            COPY PRICING TO PREVIOUS PRICING
         STA      PRRP
         LDA      SP
         STA      PRSP
         LDX      #04           COPY CYCLE COUNTS TO PREVIOUS
MES21M   LDA      HCRC2-1,X     EVERY COLLECTION
         STA      PRRC2-1,X
         DEC      X
         BNE      MES21M
MES21A   LDA      #31           1 minute to get setup record
         STA      DOORTI        30 minutes to get door opening
         BRSET    COLL,FLAG3,MES21W DON'T SEND ACK IF
*                 TIMINT JUMPED TO CLEAR ROUTINE BECAUSE
*                 IT'S NOT SET UP TO HANDLE TRANSMITTING
         LDA      #01
         STA      HEAD2         PUT ACK VALUE INTO HEAD2
         JMP      STDTX         send ACK-all bytes are set up

*********************************************************
*CHECK THE CRC RECEIVED                                  *
*COMMENTS: IF THE CARRY BIT IS SET UPON EXIT,            *
*          THE CRC IS BAD                                *
*********************************************************
CHECRC   CLC                    preset abort flag
         LDA      CRC1
         ORA      CRC2
         BEQ      CHECR1        is CRC = 0?
BAD      SEC                    no, set abort flag
         CLR      CRC1          clear crc for next time
         CLR      CRC2
CHECR1   RTS

*********************************************************
*RECEIVED SETUP DATA1 DATA : SEND SETUP DATA2 DATA       *
*COMMENTS: A CCC SETUP MUST BE MOVED TO MAYTAG FIELDS    *
*          SO THAT WE KNOW WHAT TO DO WITH IT.           *
*          DO ALL OF THE ACTION CODE STUFF, WATCHING FOR *
*          DIP SWITCHES NOT SET AND THE CORRECT MACHINE ID*
*********************************************************
MES23F   JMP      NACKO
MESS23   BSR      CHECRC        setup DATA1 data received
         BCS      MES23F
         LDA      DOORTI
         CMP      #30           we only had 1 minute to get
         BHS      MES23E        a setup message
```

```
MES21W  JMP    ABORT1
MES23E  BRSET  CCCSET,FLAG1,MES23N

LDA    TRECTY
        CMP    #25          IS IT MAYTAG SETUP FILE?
        BNE    MES23F       NO, SEND NACK
        BRA    MES23H       YES, CONTINUE
MES23N  LDA    CAC          move ccc to maytag registers
        STA    TAC          action code MES23H  CLR    NACKCO
        LDA    MACN1        is our mac id = 0?
        ORA    MACN2
        ORA    MACN3
        BNE    MES23B       if not, branch
        BRCLR  0,TAC,MES23B yes, set machine id?
        LDX    #03          yes, loop 3 times
MES23K  LDA    TMACN1-3,X
        STA    MACN1-3,X    get machine id
        DEC    X
        BNE    MES23K       loop if not 0
        BRA    ACT1

MES23D  JMP    MES56A       if not, send collection record
MES23B  LDX    #03          no, compare setup's to ours
MES23L  LDA    TMACN1-3,X   loop 3 times
        CMP    MACN1-3,X    if the same, do action code
        BNE    MES23D       if not the same, branch
        DEC    X
        BNE    MES23L       loop if not 0
*                           they are the same
        BRCLR  0,TAC,ACT1   zero machine id?
        CLR    MACN1        yes
        CLR    MACN2
        CLR    MACN3
* DO WHATEVER THE ACTION CODE TELLS US TO DO NOW
ACT1    BSET   7,TAC        signify that we have used setup
        BRCLR  1,TAC,ACT2   action code 1 set?
        LDX    #04          yes, set location/position
ACT1A   LDA    TLOC1-4,X
        STA    LOC1-4,X
        DEC    X
        BNE    ACT1A
ACT2    BRSET  CCCSET,FLAG1,ACT5 branch if ccc setup,
*              and skip 2, 3, and 4
        BRCLR  2,TAC,ACT3
        BCLR   DIPSET,STATS1 don't use dip switches
        BCLR   DEFALT,STATS1 not using defaults CLR    X            0 = REGULAR PRICING
;              x should already = 0
        BSR    CHKPRC       check regular pricing
        LDX    #02
ACT2G   LDA    TSPBT-1,X    MAKE SURE SPECIAL
        CMP    #23          PRICING TIMES ARE
        BHI    ACT2E        IN THE RANGE 0-23
        DEC    X            DO SPECIAL END TIME
        BNE    ACT2G
        BRA    ACT2F
```

```
ACT2E    LDA    TRP             BAD SPC TIMES SO ONLY
         STA    RP              USE REGULAR PRICING.
         BCLR   FIXCYC,FEAT     FIXED CYCLE AND
         BRCLR  FIXCYC,TFEAT,ACT2H  COIN VALUES
         BSET   FIXCYC,FEAT
ACT2H    BRA    ACT2I
CHKPRC   LDA    RP,X            special price offset=1
         CMP    TRP,X           store into previous
         BEQ    CHKRET          fields if different
         STA    PRRP,X
         CLR    DTORP,X         clear topoff escrow
         LSL    X               now offsets = 2 if spc
         LDA    HCRC2,X         pricing
         STA    PRRC2,X
         LDA    HCRC1,X
         STA    PRRC1,X
CHKRET   RTS ACT2F    INC    X               x should=0, so now x=1
         BSR    CHKPRC          check special pricing
ACT2B    LDX    #06
ACT2C    LDA    TSPET-6,X       set pricing
         STA    SPET-6,X
         DEC    X
         BNE    ACT2C
ACT2I    LDA    FEAT            clear unused bits
         AND    #03
         STA-   FEAT
         LDA    TCOIN2          SET COIN VALUES
         STA    COIN2
         LDA    TCOIN1
         STA    COIN1
ACT3
ACT4     BRCLR  4,TAC,ACT5
         BCLR   DIPSET,STATS1   no, don't use dip switches
         BCLR   DEFALT,STATS1   not using defaults
         BRCLR  DRYER,FLAG1,ACT5  IF A WASHER SKIP THIS
         LDX    #02             MAKE SURE DRYER CYCLE
ACT4     LDA    TRDCL-1,X       LENGTHS ARE IN RANGE 5-99
         CMP    #99
         BHI    ACT4D           IF BAD, DON'T USE IT
         CMP    #05
         BLO    ACT4D
ACT4C    STA    RDCL-1,X        GOOD LENGTH, SO SAVE IT
ACT4D    DEC    X               DO SPECIAL DRYER LENGTH
         BNE    ACT4E ACT5     BRSET  5,TAC,ACT5C     bit 5 set?
ACT6     BRCLR  6,TAC,ACT7      no, bit 6 set?
         BRCLR  CCCSET,FLAG1,ACT7  yes, CCC setup?
ACT5C    LDX    #IRPC2          yes, clear interval values
ACT5A    CLR    ,X
         INC    X
         CPX    #IAVD0          up to time stamps
ACT5B    BLS    ACT5A
ACT7     LDX    #03             copy 2 minute ticker
ACT7A    LDA    TWOMI1-3,X      to time of last
         STA    TLSET1-3,X      setup
         DEC    X
         BNE    ACT7A
```

```
***********************************************************
*SEND SETUP DATA2 HEADER                                  *
***********************************************************
MES23A    LDX    #SETSIZ     put # of bytes into HEAD2
          BRCLR  CCCSET,FLAG1,MES23J
          LDX    #CCCSIZ     put # of ccc bytes into HEAD2
MES23J    LDA    #DLE        type data link escape message
          JMP    MESS6E      send SETUP DATA2 header
***********************************************************
*SEND SETUP DATA2 DATA                                    *
*STARTING WITH: TRECTY OR CRECTY                          *
*BYTES: CCCSIZ OR SETSIZ                                  *
***********************************************************
MESS25    BRCLR  CCCSET,FLAG1,MES25A CCC setup?
          LDX    #05         yes, send position, location,
MES25C    LDA    POSCOD-1,X  and vend price
          STA    TPOSCO-1,X
          DEC    X
          BNE    MES25C
          LDA    TAC         send action code
          STA    CAC
          LDA    #CCSSIZ     BUFLEN
          LDX    #CRECTY     RECPTR
          BRA    MES25D
MES25A    LDA    MODNU       get model code
          STA    TMODNU      send SETUP DATA2 data from
          LDX    #SETSIZ-5-1 all except mac id &
MES25B    LDA    POSCOD-1,X  action code - use mac id
          STA    TPOSCO-1,X  from SETUP DATA1
          DEC    X
          BNE    MES25B
          LDA    #SETSIZ     BUFLEN
          LDX    #TRECTY     RECPTR
MES25D    BRA    TRET
***********************************************************
*RECEIVED SETUP ACK                                       *
*COMMENTS: THIS CONCLUDES THE SETUP MESSAGE AFTER         *
*          SENDING AN ACK                                 *
***********************************************************
MESS28    JSR    CHECRC      received SETUP ACK
          BCS    MES23A
          LDA    #ENQ
          CMP    HEAD1       check first byte
          BNE    MES23A
          LDA    #ACK        check for ack
          CMP    HEAD2       is ack ok?
          BNE    MES23A      no, send data again
          LDA    #22         message 22 is next-send ACK
          STA    MESS
          JMP    STDTX       send ACK-all bytes are ready
***********************************************************
*SEND MORE CCC DATA2 DATA                                 *
*STARTING WITH: MACHINE ID                                *
*ENDING WITH: REGULAR PRICE                               *
*BYTES: 8                                                 *
***********************************************************
MESS31    LDA    #08         send more CCC DATA2 data
          LDX    #MACN3      RECPTR
          BRA    TRET
```

```
***********************************************************
*SEND MORE CCC DATA2 DATA                                 *
*STARTING WITH: HEAD1(SOFT CUM REVENUE CYCLES)            *
*ENDING WITH: NUMBER OF PROBE READS                       *
*BYTES: 8                                                 *
*COMMENTS: SPECIAL CYCLES AND REGULAR CYCLES MUST BE      *
*          ADDED UP TO GET REVENUE CYCLES                 *
***********************************************************
MESS32   JSR   STDHD3   setup RECPTR and BUFLEN
         LDA   HCRC1    compute cycle totals for ccc
         ADD   HCSC1    send 8 bytes at HEAD1
         STA   HEAD2    keep it for transmission
         LDA   HCRC2
         ADC   HCSC2    compute high byte
         STA   HEAD1
         LDA   HCSEC2   2 bytes for service cycles
         STA   HEAD3
         LDA   HCSEC1   low byte
         STA   HEAD4    number of service cycles
         LDX   #04      also get next four bytes
MES32B   LDA   TWOMI3-1,X
         STA   HEAD5-1,X
         DEC   X
         BNE   MES32B   loop
         RTI
***********************************************************
*SEND MORE CCC DATA2 DATA :   INTERVAL COUNTS             *
*STARTING WITH: HEAD1 (INTERVAL NUMBER OF COINS)          *
*ENDING WITH: HEAD6 (INTERVAL SERVICE CYCLES)             *
*BYTES: 6                                                 *
*COMMENTS: THE INTERVAL COUNTS MUST BE STORED INTO TEMP   *
*          STORAGE TO MAKE SURE THEY ARE NOT CHANGED      *
*          AND FOR CLEARING INTERVAL COUNTS LATER.        *
***********************************************************
MESS33   JSR   STDHD1   setup RECPTR and BUFLEN
         JSR   SUB15    copy int counts to temp
*                       for clearing later
         CLR   HEAD1    clear int. coin counts
         CLR   HEAD2
         LDA   IRPC1    compute int. cycle counts
         ADD   ISPC1
         STA   HEAD4
         LDA   IRPC2
         ADC   ISPC2
         STA   HEAD3
         LDA   INR      get int. no runs
         STA   HEAD5
         LDA   ISC      get int. service cycles
         STA   HEAD6
         RTI
***********************************************************
*SEND MORE CCC DATA2 DATA : TROUBLE CYCLES, POWER DOWNS,  *
*                           SERVICE DOOR OPENINGS         *
*STARTING WITH: INTERVAL TROUBLE CYCLES                   *
*ENDING WITH: INTERVAL AUTHORIZED SERVICE DOOR OPENINGS   *
*BYTES: 4                                                 *
*COMMENTS: THEY DO NOT NEED TO BE SENT FROM THE TEMP      *
*          STORAGE BECAUSE THEY ONLY GET CHANGED IN THE   *
*          TIMER INTERRUPT, WHICH WON'T GET SERVICED      *
*          UNTIL THEY ARE COMPLETELY SENT.                *
***********************************************************
```

```
MESS34   LDA   #04       send trouble cycles, power
         LDX   #ITC      downs, service door openings
TRET     BRA   RETURN    setup RECPTR & BUFLEN
```
*************************************************
*SEND MORE CCC DATA2 DATA : TIME OF OPENINGS     *
*STARTING WITH: TIME OF LAST SERVICE DOOR OPEN HIGH *
*ENDING WITH: TIME OF LAST VAULT OPENING LOW     *
*BYTES: 4                                        *
*************************************************
```
MESS35   LDA   #04       send time of openings for ccc
         LDX   #TLSD2    RECPTR
         BRA   RETURN
```
*************************************************
*SEND MORE CCC DATA2 DATA                        *
*STARTING WITH: TIME OF PREVIOUS VAULT OPENING   *
*ENDING WITH: TIME OF PREVIOUS VAULT OPENING     *
*BYTES: 2                                        *
*************************************************
```
MESS36   LDA   #02       previous vault door
         LDX   #TPVD2    RECPTR
         BRA   RETURN
```
*************************************************
*SEND MORE CCC DATA2 DATA                        *
*STARTING WITH: HEAD1 (INTERVAL NUMBER OF VAULT OPENINGS) *
*ENDING WITH: HEAD7 (UNUSED)                     *
*BYTES: 7                                        *
*COMMENTS: THE CUMULATIVE MONEY COUNT WAS ADDED IN *
*          MAYTAG'S REVISION 66 OF THE CCC DATA STREAM *
*************************************************
```
MESS37   LDA   IUVDO     number of vault openings
         ADD   IAVDO
         BCC   MES37B    did it roll over?
         LDA   #$FF      yes, set to maximum
MES37B   STA   HEAD1
         LDX   #06
MES37A   CLR   HEAD2-1,X  CLEAR UNUSED BYTES
         DEC   X
         BNE   MES37A
         LDA   #07       BUFLEN
         LDX   #HEAD1    RECPTR
         BRA   RETURN
```
*************************************************
*SEND MORE CCC DATA2 DATA                        *
*STARTING WITH: HEAD4 (2 BYTE HARD MONEY COUNT)  *
*ENDING WITH: HEAD8 (CUMULATIVE RUN TIME)        *
*BYTES: 5                                        *
*COMMENTS:                                       *
*************************************************
```
MESS38   LDA   #66       revision level
         STA   HEAD6
         LDX   #01       send cum run time and
MES38A   LDA   CUMRT2,X  cum money count
         STA   HEAD7,X   don't let it change
         LDA   HCM2,X    while it is sent
         STA   HEAD4,X
         DEC   X
         BPL   MES38A
         LDA   #05       BUFLEN
         LDX   #HEAD4    RECPTR
         BRA   RETURN
```

```
***********************************************************
*SEND MORE CCC DATA2 DATA                                 *
*STARTING WITH: STATS1                                    *
*ENDING WITH: STATS2,UNUSED                               *
*BYTES: 3                                                 *
*COMMENTS: AFTER THE CRC IS SENT, THIS CONCLUDES SENDING  *
*          THE CCC DATA2 DATA.  RECEIVE ACK IS NEXT.      *
*          THE LAST BYTE OF THE CCC DATA STREAM IS AN     *
*          UNUSED BYTE THAT VERTICAL SYSTEMS DISCOVERED.  *
*          MOST PREVIOUS DOCUMENTATION FROM JOHN WICK     *
*          INDICATED IT WASN'T THERE(47 BYTES), BUT       *
*          ANALYZING DATA FROM THEIR DATA BOX SHOWS       *
*          THAT IT IS.                                    *
***********************************************************
MESS39    LDA   #19       get ack or nack next
          STA   MESS      after sending CRC
          LDA   #03       BUFLEN
          LDX   #STATS1   RECPTR
          BRA   RETURN
***********************************************************
*RETURN FROM INTERRUPT                                    *

*A LITTLE ROUTINE TO SAVE SPACE                           *
***********************************************************
RETURN    STA   BUFLEN    set up to receive or send
          STX   RECPTR
RETINT    RTI
***********************************************************
*This sets up to send a standard header without crc
STDHD1    LDA   #06
          BRA   STDHD2
*This sets up to receive a standard header
STDHED    CLR   CRC1      clear crc area
          CLR   CRC2
STDHD3    LDA   #08       8 bytes
STDHD2    LDX   #HEAD1
STDHD4    STA   BUFLEN
          STX   RECPTR
          CLR   HEAD3
          CLR   HEAD4
          CLR   HEAD5
          CLR   HEAD6
          RTS TABLE     FDB   MESS1
          FDB   MESS2
          FDB   MESS3
          FDB   MESS4
          FDB   MESS5
          FDB   MESS6
          FDB   MESS7
          FDB   MESS8
          FDB   MESS9
          FDB   MESS10
          FDB   MESS11
          FDB   MESS12
          FDB   MESS13
          FDB   MESS14
          FDB-  MESS15
```

```
        FDB     MESS16
        FDB     MESS17
        FDB     MESS18
        FDB     MESS19
        FDB     MESS20
        FDB     MESS21
        FDB     MESS22
        FDB     MESS23
        FDB     MESS24
        FDB     MESS25
        FDB     MESS26
        FDB     MESS27
        FDB     MESS28
        FDB     MESS29
        FDB     MESS30
        FDB     MESS31
        FDB     MESS32
        FDB     MESS33
        FDB     MESS34
        FDB     MESS35
        FDB     MESS36
        FDB     MESS37
        FDB     MESS38
        FDB     MESS39

* LOOKUP TABLE OF OFFSET VALUES

TABLE1  FCB     $01
        FCB     $04
        FCB     $03
        FCB     $06
        FCB     $01
        FCB     $04
        FCB     $06
        FCB     $02
        FCB     $05
        FCB     $00
        FCB     $03
        FCB     $05
************************************************************
*VECTOR ADDRESSES                                           *
************************************************************
        ORG     $1FF4           SCI/TIMER VECTOR ON V0
        FDB     SCI
        ORG     $1FF6           SCI/TIMER VECTOR ON Y0
        FDB     SCI
        ORG     $1FF8           TIMER/INT2 VECTOR
        FDB     TIMINT
        ORG     $1FFA           INTERRUPT VECTOR
        FDB     RETINT
        ORG     $1FFC           SWI VECTOR
        FDB     SWINT
        ORG     $1FFE           RESET VECTOR
        FDB     INIT
        END
```

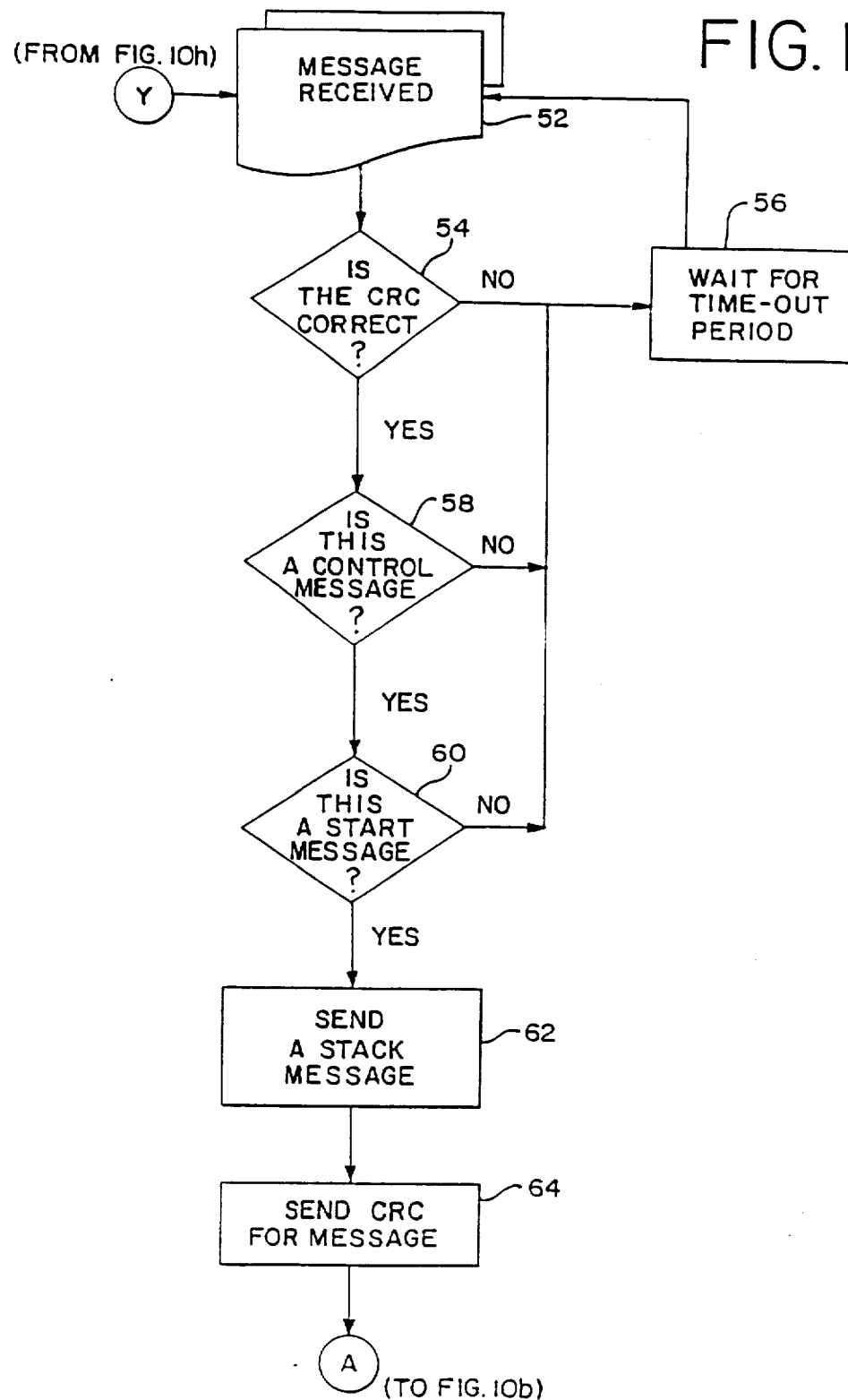

What is claimed is:

1. A data collection system for use with one or more appliances of the type which provide services for money received, the data collection system comprising:
   individual and separate data acquisition units resident in a plurality of appliances for sensing money received and the services dispensed for each appliance and for summarizing the data in at least a first format and a second format, the first format being different from the second format, each data acquisition unit having a memory for storing the summarized data and a transceiver for transmitting the summarized data in the first format or in the second format: and
   a data probe for interrogating a plurality of data acquisition units to receive the summarized data from each data acquisition unit, wherein the data probe identifies itself to the data acquisition unit and the data acquisition unit transmits the summarized data in the first format or in the second format depending upon the identity of the data probe.

2. A data collection system according to claim 1 wherein the transceiver of the data acquisition unit includes an optical transmitter and an optical detector.

3. A data collection system according to claim 1 wherein the summarized data is transmitted electro-optically.

4. A method for collecting data from one or more appliances of the type which provide services for money received, the method comprising the steps of:
   providing individual and separate data acquisition units resident in a plurality of appliances for sensing money received and the services dispensed for each appliance and for summarizing the data in a first format or in a second format, the first format being different from the second format, each data acquisition unit having a memory for storing the summarized data and a transceiver for transmitting the summarized data in the first format or in the second format;
   providing a data probe for interrogating a plurality of data acquisition units;
   using the data probe to interrogate a data acquisition unit by transmitting an interrogation signal, the interrogation signal including identification information;
   receiving the interrogation signal in a data acquisition unit; and
   responding to the interrogation signal by selecting the first format or the second format of the summarized data depending upon the identification information provided by the data probe and transmitting the summarized data in the first format or in the second format.

* * * * *

UNITED STATES PATENT AND TRADEMARK OFFICE
CERTIFICATE OF CORRECTION

PATENT NO. : 5,376,930

DATED : December 27, 1994

INVENTOR(S) : Scott A. Merkle, et al.

It is certified that error appears in the above-identified patent and that said Letters Patent is hereby corrected as shown below:

The sheet of drawing consisting of figure 10a, should be added as shown on the attached page.

Sheet 12 of the drawing figures should be deleted.

Signed and Sealed this

Fifth Day of December, 1995

Attest:

BRUCE LEHMAN

Attesting Officer

Commissioner of Patents and Trademarks